United States Patent
Lulu et al.

(10) Patent No.: US 11,728,839 B2
(45) Date of Patent: Aug. 15, 2023

(54) OSCILLATOR SYNCHRONIZATION IN MULTIPLE ANTENNAS SYSTEMS USING MUTUAL COUPLING SIGNALS

(71) Applicant: KMB Telematics, Inc., Arlington, VA (US)

(72) Inventors: Amro Lulu, Arlington, VA (US); Robin Irazoqui, Arlington, VA (US); Marco La Manna, Arlington, VA (US); Bryan Cattle, Arlington, VA (US)

(73) Assignee: KMB Telematics, Inc., Washington, DC (US)

( * ) Notice: Subject to any disclaimer, the term of this patent is extended or adjusted under 35 U.S.C. 154(b) by 121 days.

(21) Appl. No.: 17/331,524

(22) Filed: May 26, 2021

(65) Prior Publication Data
US 2023/0129011 A1   Apr. 27, 2023

Related U.S. Application Data

(60) Provisional application No. 63/129,767, filed on Dec. 23, 2020, provisional application No. 63/029,911, filed on May 26, 2020.

(51) Int. Cl.
*H04B 1/30* (2006.01)
*H04B 1/403* (2015.01)
(Continued)

(52) U.S. Cl.
CPC .......... *H04B 1/403* (2013.01); *H01Q 3/2658* (2013.01); *H01Q 3/30* (2013.01); *H04B 1/18* (2013.01)

(58) Field of Classification Search
CPC ........ H04B 1/30; H04B 7/0837; H04B 1/403; H04B 1/18; H04B 1/40; H04B 1/408; H04B 1/0082; H01Q 3/2658; H01Q 3/30
See application file for complete search history.

(56) References Cited

U.S. PATENT DOCUMENTS

| 4,755,829 A | 7/1988 | Dinger et al. |
| 9,571,262 B2 * | 2/2017 | Kurby .................. H04L 7/0012 |

(Continued)

FOREIGN PATENT DOCUMENTS

JP   200229943 A   10/2002

OTHER PUBLICATIONS

Ahmed, Sherif Sayed Aboelyazeed; "Electronic Microwave Imaging with Planar Multistatic Arrays" (two parts); Thesis accepted by Faculty of Engineering; Date Apr. 26, 2013.
(Continued)

*Primary Examiner* — Tuan Pham
(74) *Attorney, Agent, or Firm* — Novak Druce Carrol LLP

(57) ABSTRACT

Systems, methods, and computer-readable media for synchronizing oscillators. A system can include a plurality of oscillators comprising at least a first oscillator and a second oscillator. The system can also include a plurality of antennas comprising at least a first antenna and a second antenna. Further, the system can include a first oscillator synchronizer coupling the first oscillator to the first antenna. The first oscillator synchronizer can be operative to perform a first synchronization of a first time base of the first oscillator to a second time base of the second oscillator based on a first mutual coupling signal. The first mutual coupling signal can represent a first interaction between the first antenna and the second antenna.

29 Claims, 17 Drawing Sheets

(51) Int. Cl.
*H01Q 3/30* (2006.01)
*H01Q 3/26* (2006.01)
*H04B 1/18* (2006.01)

(56) References Cited

U.S. PATENT DOCUMENTS

| | | | | |
|---|---|---|---|---|
| 10,784,911 | B2* | 9/2020 | Mizutani | H04B 1/30 |
| 2012/0188998 | A1* | 7/2012 | Philips | H04W 56/001 |
| | | | | 370/350 |
| 2022/0099795 | A1 | 3/2022 | Crouch et al. | |

OTHER PUBLICATIONS

Ahmed, Sherif Sayed, et al.; "A Novel Fully Electronic Active Real-Time Imager Based on a Planar Multistatic Sparse Array"; IEEE Transactions on Microwave Theory and Techniques; vol. 59, No. 12; Dec. 2011; pp. 3567-3576.

Ahmed, Sherif Sayed, et al.; "Advanced Microwave Imaging"; IEEE Microwave Magazine; Sep. 13, 2012; pp. 26-43.

Bechter, Jonathan, et al.; "Compensation of Motion-Induced Phase Errors in TDM MIMO Radars"; IEEE Microwave and Wireless Components Letters; vol. 27, No. 12; Dec. 2017; pp. 1164-1166.

Biallawons, Oliver, et al.; "First 3D Imaging Results with the MIMO Radar of RAWIS"; European Conference on Synthetic Aperture Radar, 2018; pp. 27-31.

Biallawons, Oliver, et al.; "Improved UAV Detection with the MIMO Radar MIRA-CLE Ka using Range-Velocity Processing and TDMA Correction Algorithms"; The 19th International Radar Symposium IRS; Jun. 20-22, 2018; pp. 1-10.

Biallawons, Oliver, et al.; "MIMO concept for the imaging radar of the radar warning and information system RAWIS"; 11th European Conference on Synthetic Aperture Radar; 2016; pp. 75-78.

Biallawons, Oliver; "Realization and calibration of the MIMO radar MIRA-CLE Ka"; International Journal of Microwave and Wireless Technologies; 2014; pp. 405-413.

Bleh, D., et al.; "A 100 GHz FMCW MIMO radar system for 3D image reconstruction"; Proceedings of the 13th European Radar Conference; Oct. 5-7, 2016; pp. 37-40.

Bleh, Daniela Karina; "W-Band FMCW MIMO radar demonstrator system for 3D imaging"; Dissertation; Mar. 20, 2017; pp. 1-119.

Bleh, Daniela, et al.; "W-Band Time-Domain Multiplexing FMCW MIMO Radar for Far-Field 3-D Imaging"; IEEE Transactions on Microwave Theory and Techniques; 2017 IEEE; pp. 1-11.

Bliss, D.W., et al.; "Multiple-Input Multiple-Output (MIMO) Radar and Imaging: Degrees of Freedom and Resolution"; IEEE 2003; pp. 54-59.

Brooker, Graham, et al.; "Using the Polarization of Millimeter-wave Radar as a Navigation Aid"; Journal of Field Robotics; 32(1); 2015.

Ender, Joachim, H.G., et al.; "System architectures and algorithms for radar imaging by MIMO-SAR"; 2009 IEEE; pp. 1-6.

Feger, R., et al.; "Low-Cost Implementation of a Millimeter Wave Imaging System Operating in W-Band"; 2013 IEEE; pp. 1-4.

Feger, Reinhard, et al.; "A 77-GHz FMCW MIMO Radar Based on an SiGe Single-Chip Transceiver"; IEEE Transactions on Microwave Theory and Techniques; vol. 57, No. 5; May 2009; pp. 1020-1035.

Guetlein, Johanna, et al.; "Calibration Strategy for a TDM FMCW MIMO Radar System";IEEE International Conference on Microwaves Communications; Oct. 2013; pp. 1-5.

Guetlein, Johanna, et al.; "Motion Compensation for a TDM FMCW MIMO Radar System"; Proceedings of the 10th European Radar Conference; Oct. 9-11, 2013; pp. 37-40.

Guetlein, Johanna, et al.; "Switching Scheme for a FMCW-MIMO Radar on a Moving Plateform"; Proceedings of the 9th European Radar Conference; Oct. 31-Nov. 2, 2012; pp. 91-94.

Guvenc, Ismail, et al.; "Detection, Localization, and Tracking of Unauthorized UAS and Jamemrs"; https:/ntrs.nasa.gov/search.jsp?R=20170009465; pp. 1-10.

Hakobyan, Gor; "Orthogonal Frequency Division Multiplexing Multiple-Input Multiple-Output Automotive Radar with Novel Signal Processing Algorithms"; 2018; pp. 1-188.

Huang Y.; "FMCW Based MIMO Imaging Radar for Maritime Navigation"; Progress in Electromagnetics Research; vol. 115, 327-342, 2011; pp. 327-342.

Huang, Penghui, et al.; "Long-Time Coherent Integration for Weak Maneuvering Target Detection and High-Order Motion Parameter Estimation Based on Keystone Transform"; IEEE Transactions on Signal Processing; 2016; pp. 1-15.

Jahn, Martin, et al.; "A Four-Channel 94-GHz SiGE-Based Digital Beamforming FMCW Radar"; IEEE Transactions on Microwave Theory and Techniques; vol. 60, No. 3; Mar. 2012; pp. 861-869.

Klare, Jens, et al.; "First Experimental Results with the Imagining MIMO Radar MIRA-CLE X"; European Conference on Synthetic Aperture Radar, 2010; pp. 374-377.

Klare, Jens, et al.; "MIRA-CLE X: A new Imaging MIMO-Radar for Multi-Purpose Applications"; Proceedings of the 7th European Radara Conference; Sep. 30-Oct. 1, 2010; pp. 129-132.

Klare, Jens, et al.; "UAV detection with MIMO radar"; The 18th International Radar Symposium; Jun. 28-30, 2017; pp. 1-8.

Lee, J.-S., et al.; "Automated Terrain Classification Using Polarimetric Synthetic Aperature Radar"; Remote Sensing; 2005 NRL Review; pp. 203-205.

Li, Jian, et al.; "MIMO Radar with Colocated Antennas"; IEEE Signal Processing Magazine; Sep. 2007; pp. 106-114.

Li, Yang, et al.; "Range Migration Compensation and Doppler Ambiguity Resolution by Keystone Transform"; 2006 IEEE; pp. 1-4.

Patole, Sujeet, et al.; "Automotive Radars"; Signal Processing For Smart Vehicle Technologies: Part 2; ISSS Signal Processing Magazine; Mar. 2017; pp. 22-35.

Perry, R.P., et al.; "SAR Imaging of Moving Targets"; IEEE Transactions on Aerospace and Electronic Systems; vol. 35, No. 1; Jan. 1999; pp. 188-200.

Qiong, Le, et al.; "An Overview of Self-Calibration in Sensor Array Processing"; IEEE 2003; pp. 279-282.

Rambach, Kilian; "Direction of Arrival Estimation Using a Multiple-Input-Multiple-Output Radar with Applications to Automobiles"; 2017; pp. 1-213.

Rankin, G.A., et al.; "Radar Imaging: Conventional and MIMO"; 2012 IEEE; pp. 171-176.

Rankin, Gerard, et al.; "Millimeter Wave Array for UAV Imaging MIMO Radar"; Conference: International Radar Symposium; Jun. 2015; pp. 1-6.

Richards, Mark A.; "The Keystone Transformation for Correcting Range Migration in Range-Doppler Processing"; Mar. 28, 2014; pp. 1-29.

Rohling, Hermann, et al.; "Continuous waveforms for automotive radar systems"; 2012 Institution of Engineering and Technology; pp. 173-205.

Schiessl, Andreas, et al.; "Phase Error Sensitivity in Multistatic Microwave Imaging Systems"; Proceedings of the 43rd European Microwave Conference; Oct. 7-10, 2013; pp. 1631-1634.

Schmid, Christian M., et al.; "Motion Compensation and Efficient Array Design for TDMA FMCW MIMO Radar Systems"; 6th European Conference on Antennas and Propagation; 2011 IEEE; pp. 1746-1750.

Spreng, Thomas, et al.; "UWB Near-Field MIMO Radar: Calibration, Measurements and Image Reconstruction"; Proceedsing of the 10th European Radar Conference; Oct. 9-11, 2013; pp. 33-36.

Sun, Hongbo, et al.; "Analysis and Comparison of MIMO Radar Waveforms"; 2014 International Radar Conference; IEEE; pp. 1-6.

Ulander, Lars, M.H., et al.; "Synthetic-Aperture Radar Processing Using Fast Factorized Back-Projection"; IEEE Transactions on Aerospace and Electronic Systems; vol. 39, No. 3; Jul. 2003; pp. 760-776.

Van Dorp, Philip; "LFMCW based MIMO imaging processing with Keystone Transform"; Proceedings of the 10th European Radar Conference; Oct. 9-11, 2013; pp. 467-470.

Winkler, Volker; "Range Doppler Detection for automotive FMCW Radars"; 2007 EuMA; Oct. 2007; pp. 166-169.

(56) References Cited

OTHER PUBLICATIONS

Zankl, Dominik, et al.; "BLASTDAR—A Large Radar Sensor Array System for Blast Furnace Burden Surface Imaging"; IEE Sensors Journal; vol. 15, No. 10; October.

Zankl, Dominik, et al.; "Radar Array Self-Calibration and Imaging with Applications to Bulk Material Gauging"; GeMiC 2016; Mar. 14-16, 2016; pp. 313-316.

Zankl, Dominik, et al.; "What a Blast!"; IEEE Microwave Magazine; Sep./Oct. 2017; pp. 52-69.

Zhuge, Xiaodong; "Short-Range Ultra-Wideband Imaging with Multiple-Input Multiple-Output Arrays"; Dissertation at Delft University of Technology; 2010; pp. 1-227.

English abstract of JP2002299943; retrieved from www.espacenet.com on Jun. 22, 2023.

\* cited by examiner

US 11,728,839 B2

OSCILLATOR SYNCHRONIZATION IN MULTIPLE ANTENNAS SYSTEMS USING MUTUAL COUPLING SIGNALS

CLAIM OF PRIORITY

This application makes a claim of priority under 35 U.S.C. § 119 to Provisional U.S. Pat. App Ser. No. 63/029,911, filed, May 26, 2020, entitled "LOCAL OSCILLATOR SYNCHRONIZATION USING CROSS-CHANNEL LEAKAGE MEASUREMENTS"; and to Provisional U.S. Pat. App. Ser. No. 63/129,767, entitled, "Oscillator SYNCHRONIZATION," filed Dec. 23, 2020. The contents of these applications are hereby incorporated by reference as if set forth fully herein.

TECHNICAL FIELD

The technical field relates to synchronizing oscillators in systems with multiple antennas, and more particularly to synchronizing oscillators based on mutual coupling signals that reside between electronic elements in systems having multiple antennas.

BACKGROUND

Many electronic systems have multiple elements that need to be synchronized during operation of the electronic systems. For example, a wireless system (e.g., one used in a vehicle, a wireless network, a satellite system, in airspace monitoring/surveillance, etc.) can include multiple elements that are synchronized during operation. Oscillators have been used to provide common time bases for synchronizing elements in electronic systems. For instance, a single master/ shared local oscillator (LO) can be used to provide a single common time base in an electronic system. However, electronic systems that rely on a single master LO to synchronize elements are both difficult to design and expensive Implementing a single master LO in electronic systems that operate at high frequencies is both difficult from a design perspective and extremely expensive. A signal path for transmitting a signal from a signal master LO to multiple elements can run at high frequency and have demanding timing requirements. Further, the signal may have to be amplified as the signal path grows and gets more complex. Additionally, power dividers might have to be added to the signal path, further increasing the design complexity, e.g. to account for delay error and loss. This can decrease the reliability of the electronic system, as such components are prone to failure.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1A:
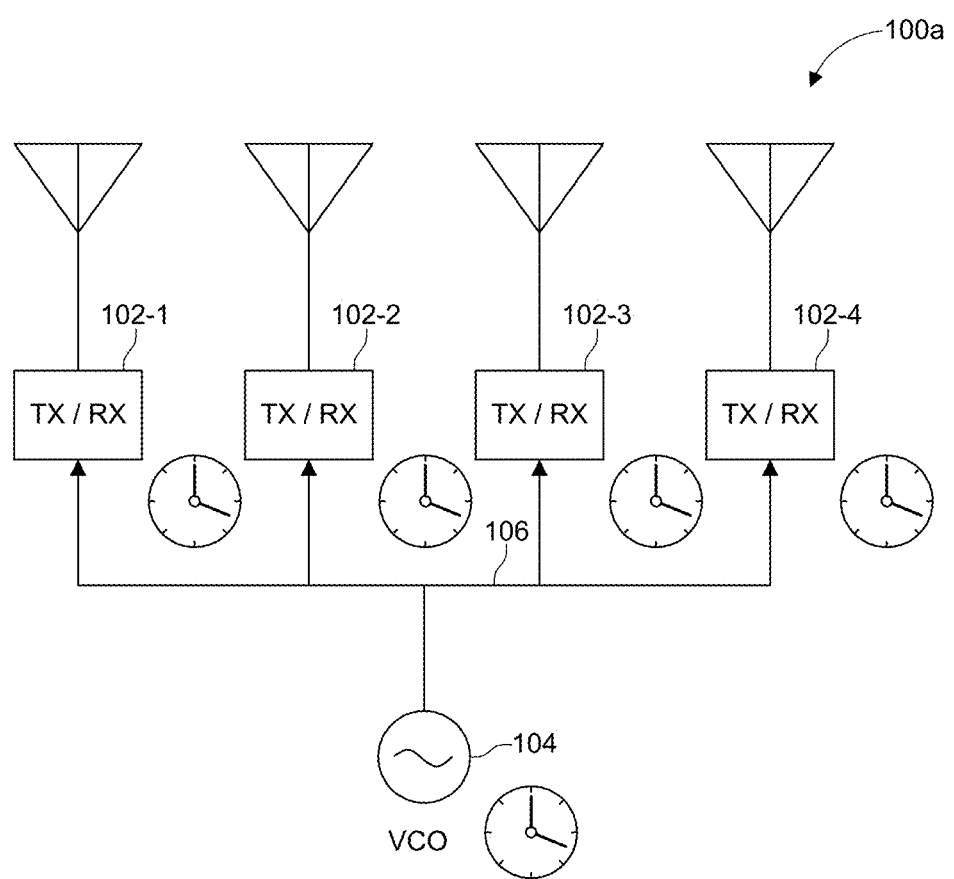
FIG. 1A illustrates an example of a multiple antenna system with a shared LO.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

This disclosure describes various systems, methods, and computer-readable media for synchronizing oscillators. For instance, this disclosure describes various techniques to synchronize different oscillators in various systems with multiple antennas. As noted herein, the techniques can include synchronizing oscillators based on mutual coupling using mutual coupling signals that reside between electronic elements in systems that have multiple antennas. Non-limiting examples of systems that the techniques can apply to include manually driven/piloted vehicles, autonomous vehicles, unmanned aerial vehicles (UAVs), other vehicles, various airspace monitoring and surveillance applications (air traffic control applications, drone detection, etc.), satellite uplink/downlink systems, etc.

In various embodiments, a system includes a plurality of oscillators comprising at least a first oscillator and a second oscillator. The system also includes a plurality of antennas comprising at least a first antenna and a second antenna. The system includes a first oscillator synchronizer coupling the first oscillator to the first antenna. The first oscillator synchronizer is operative to perform a first synchronization of a first time base of the first oscillator to a second time base of the second oscillator based on a first mutual coupling signal. The mutual coupling signal represents a first interaction between the first antenna and the second antenna.

In certain embodiments, a multiple-input multiple-output (MIMO) radar system includes a plurality of oscillators comprising at least a follower oscillator and one or more leader oscillators. The plurality of oscillators can be configured to provide one or more signals. The MIMO radar system also includes a plurality of MIMO radar antennas comprising at least a follower MIMO radar antenna and one or more leader MIMO radar antennas. The plurality of MIMO radar antennas can be configured to transform the one or more signal into one or more radar signals in relation to a target. The MIMO radar system include a follower oscillator synchronizer coupling the follower oscillator to the follower MIMO radar antenna. The follower oscillator synchronizer can be operative to perform one or more synchronizations of a first time base of the follower oscillator to one or more time bases of the one or more leader oscillators based on one or more mutual coupling signals. The one or more mutual coupling signals can represent one or more interactions between the follower MIMO radar antenna and the one or more leader MIMO radar antennas.

In various embodiments, a method includes identifying oscillator properties of a first oscillator of a plurality of oscillators to synchronize with a second oscillator of the plurality of oscillators. The oscillator properties can define a frequency of oscillation, a waveform phase, or some combination thereof. The method also includes identifying a first mutual coupling signal representing a first interaction between a first antenna of a plurality of antennas and a second antenna of the plurality of antennas. Further, the method includes performing, by an oscillator synchronizer, a first synchronization of a first time base of the first oscillator to a second time base of the second oscillator based on the first mutual coupling signal.

In certain embodiments, a method includes identifying oscillator properties of a follower oscillator of a plurality of oscillators to synchronize with one or more leader oscillators of the plurality of oscillators. The oscillator properties can define a frequency of oscillation, a waveform phase, or some combination thereof. The method also includes identifying one or more mutual coupling signals representing one or more interactions between a follower antenna of a plurality of antennas and one or more leader antennas of the plurality of antennas. Further, the method includes performing, by an oscillator synchronizer, one or more synchronizations of a first time base of the follower oscillator to one or more time bases of the one or more leader oscillators based on the one or more mutual coupling signals.

Description

The disclosed technology addresses various technical needs, including one or more technical needs in the art for synchronizing a plurality of oscillators in an electronic system. The present technology involves systems, methods, and computer-readable media for synchronizing oscillators based on cross-channel leakage measurements. These systems include hardware, software, and/or firmware, examples of which are disclosed at length herein.

As discussed previously, many electronic systems have multiple elements that need to be synchronized during operation of the electronic systems. For example, a radio transceiver can include multiple elements that are synchronized during operation of the radio transceiver. Oscillators have been used to provide common time bases for synchronizing elements in electronic systems. Specifically, a single master/shared LO can be used to provide a single common time base in an electronic system. However, electronic systems that rely on a single master LO to synchronize elements are both difficult to design and expensive. Implementing a single master LO in electronic systems that operate at high frequencies is both difficult from a design perspective and extremely expensive.

In many wireless systems, such as many radio frequency (RF) systems, frequency up-conversion or down-conversion to/from a high frequency that travels well through space from/to a low frequency that can be processed easily is performed using analog and digital electronics. For example, down-conversion can be accomplished by the multiplication of a sinusoidal signal at a high frequency with a sinusoid at an intermediate frequency to produce two new sinusoids at the sum and difference frequencies. The sum can be filtered out and the difference, e.g. the baseband, can be used for further processing.

Also, in many wireless systems, arrays of circuit elements are used to increase a particular circuit property beyond what is achievable by a single element alone. For example, arrays of antennas can be used to increase system gain, cascades of power amplifiers may be used to increase system power, etc. Often, a system that uses arrays of circuit elements has to perform down-conversion at multiple locations in the circuit. As follows, this down-conversion step should be synchronized at the various locations to ensure that the individual circuit elements, e.g. antennas in the array of antennas, are functioning coherently, as will be discussed in greater detail later. Electronic systems that have circuits capable of disposing high-fidelity synchronization signals in more than one location of a board would be desirable.

One solution to issues of synchronization is to integrate a single LO into the circuit to synchronize the various circuit elements. The description now continues with a discussion of using a single LO to control synchronization and the deficiencies that are associated with user of a single LO. FIG. 1A illustrates an example of a radio frequency circuit 100a with a shared LO. The circuit 100a includes four antenna coupling elements 102-1, 102-2, 102-3, and 102-4 (shown in FIG. 1A as transmitter/receiver elements 102-1, 102-2, 102-3, and 102-4 and collectively referred to as the antenna coupling elements 102), which are fed from a single voltage-controlled oscillator (VCO) 104. While a VCO is utilized in the circuit 100 for synchronizing the antenna coupling elements 102, any applicable oscillator or clock generation circuit can be integrated in the circuit 100 for synchronizing the antenna coupling elements 102. Further, while antenna coupling elements 102 are shown in FIG. 1A, these elements could be any applicable circuit elements that are capable of being synchronized with each other. The VCO 104 functions to synchronize the antenna coupling elements 102 in time. In particular, the antenna coupling elements 102 can be synchronized to operate coherently. Coherently, as used herein, can include synchronizing circuit elements such that they are operating in phase. In turn, when the circuit elements operate in phase, up-conversion and/or down-conversion can be performed without any loss of phase information. Despite the cost of synchronizing the circuit 100 such that the antenna coupling elements 102 operate coherently, there are many advantages to such coherent operation. For example, coherent operation allows multiple received signals to be summed to increase the signal to noise ratio (SNR). This is extremely useful in circuits that operate with faint signals, like radar or long-range communications systems.

As discussed herein, systems that rely on a single LO to provide a common time base are difficult to design and expensive. In the circuit 100 shown in FIG. 1A, the signal path 106 from the VCO 104 is shown as the thick line with arrowheads. This signal path 106 is an expensive and difficult element to design. In particular and as discussed herein, the signal path 106 typically runs at high frequency with demanding timing requirements. Further, the signal path 106 can require its own amplification, and its cost can be expected to scale with a number of factors related to the circuit 100, such as the number of elements that are synchronized in the circuit 100.

Figure 1B:
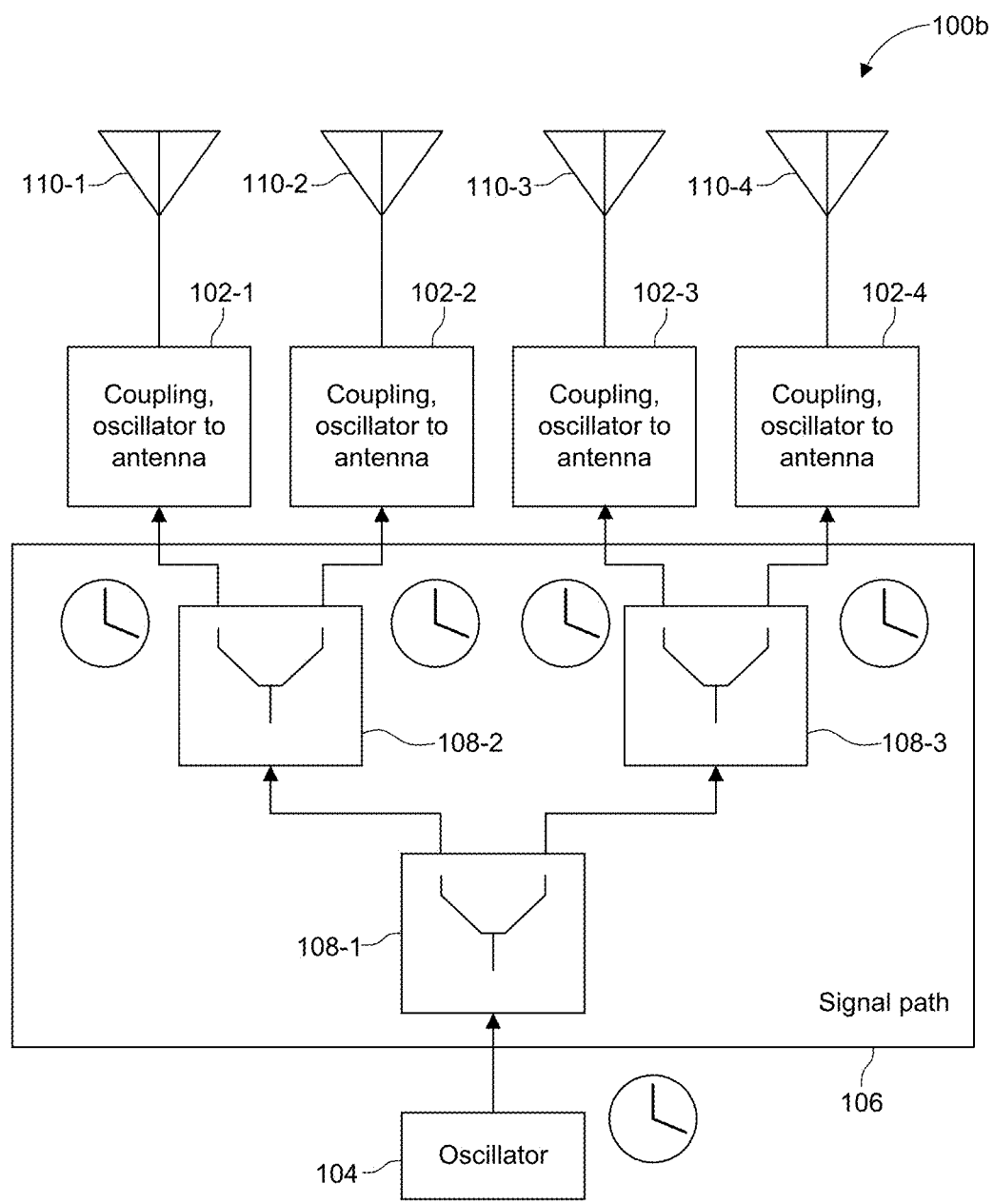
FIG. 1B is a diagram showing an example of a multiple antenna system with power dividers coupling multiple antennas to a shared LO.

Additionally, the signal path 106 can include RF power dividers. As an example, FIG. 1B is a diagram showing an example of a multiple antenna system 100b with power dividers 108 coupling multiple antennas 110 (shown as antennas 110-1, 110-2, 110-3, and 110-4) to a shared LO 104. The signal path 106 can include the power dividers 108. In the example of FIG. 1B, the power dividers 108 can include a first power divider 108-1 coupled to the LO 104, and two or more power dividers 108-2 and 108-3 coupled to the antenna coupling elements 102 and to the first power divider 108-1. The power dividers 108 may operate to divide the power of signals through the signal path 106. The power dividers 108 may include resistive elements and can be difficult to design, add delay-error, and/or add losses within the signal path 106. Designing a system with the power dividers 108 or other elements to amplify portions of the signal path 106 can introduce circuit elements that can fail, and can decrease the reliability of the circuit 100.

Figure 1C:
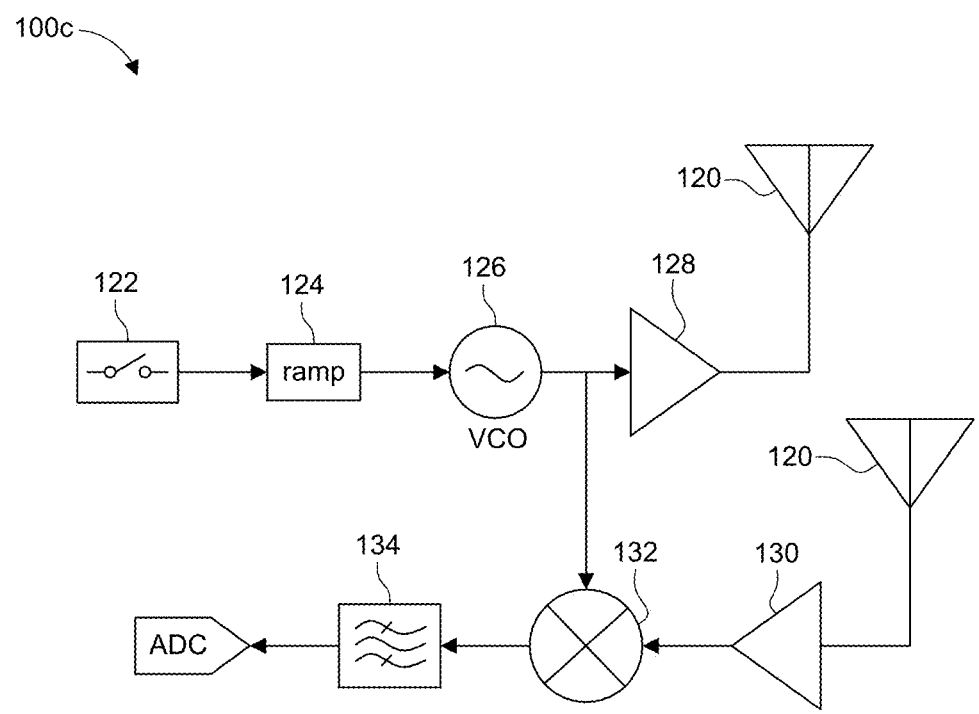
FIG. 1C illustrates an example of a multiple antenna system with a shared LO.
Figure 1D:
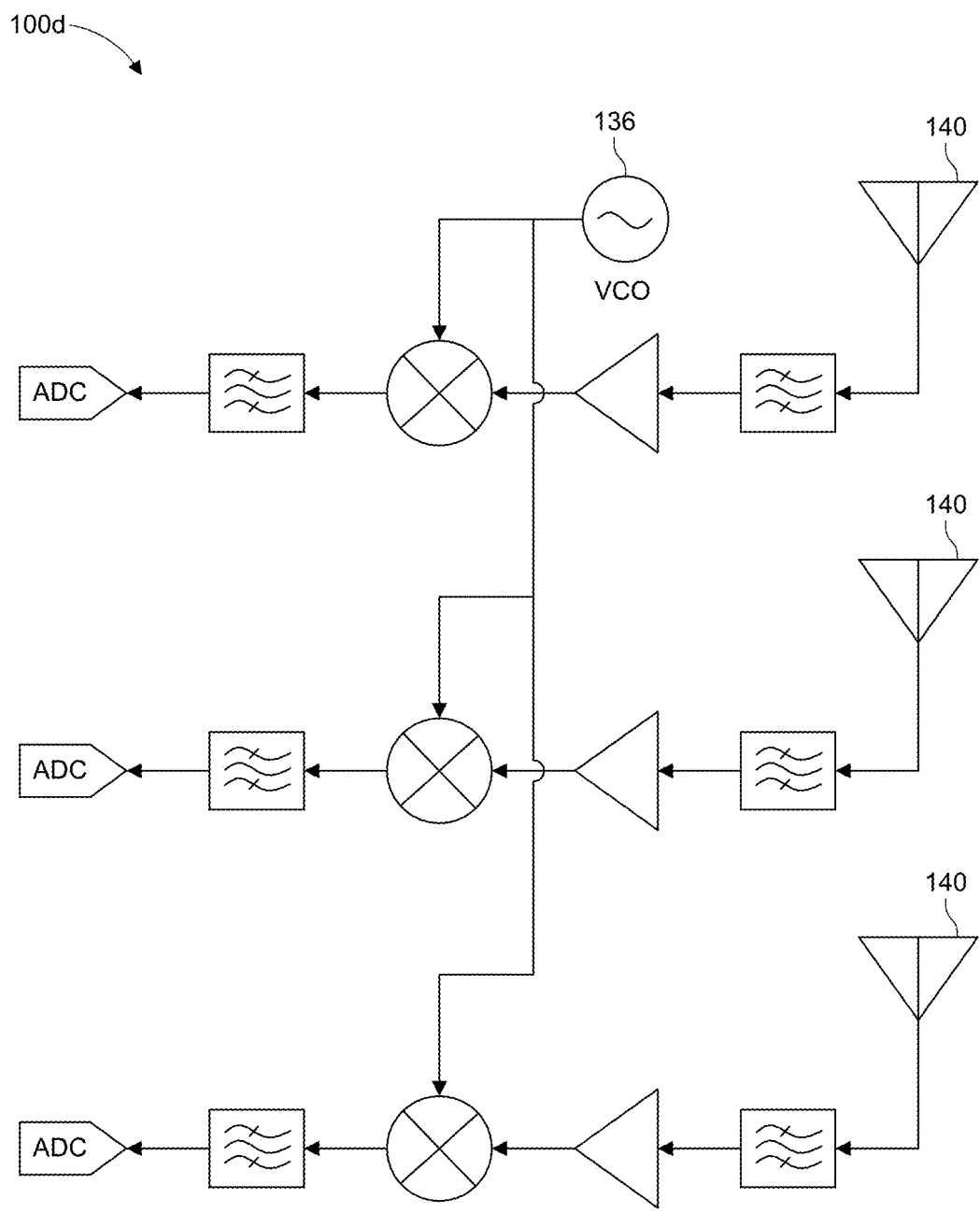
FIG. 1D illustrates an example of a multiple antenna system with a shared LO.

As another example, FIG. 1C illustrates an example of a multiple antenna system 100c with a shared LO 126. The multiple antenna system 100c includes a plurality of antennas 120, signal generator elements 122 and 124, a LO 126, amplifiers 128 and 130, mixing elements 132, signal filtering elements 134, and signal conversion elements 136. Due to the shared LO 126 and the plurality of antennas 120, the multiple antenna system 100c may be difficult to design and/or implement. As yet another example, FIG. 1D illustrates an example of a multiple antenna system 100d with a plurality of antennas 140 and a shared LO 136. Due to the shared LO 136 and the plurality of antennas 140, the multiple antenna system 100c may be difficult to design and/or implement.

It would be desirable if there were wireless systems that do not rely on a single LO to synchronize elements, that eliminate reliance on a shared signal path between an oscillator and multiple antennas (e.g. signal path 106, from the LO to the elements), and/or did not require introduction of extra power dividers and/or other amplification elements into the signal path between LOs and multiple antenna.

In some implementations, the systems and methods disclosed herein include multiple antenna systems fed by multiple oscillators; the time bases of the multiple oscillators are synchronized based on mutual coupling signals from the multiple antennas. The multiple antenna systems can find applications in various systems, including integration into and/or coupling to vehicles (manually driven/piloted vehicles, autonomous vehicles, unmanned aerial vehicles (UAVs), etc.), airspace monitoring/surveillance (air traffic control, drone detection, etc.), satellite uplink/downlink applications, cellular applications (e.g., 5G applications), etc. In vehicular (e.g., automotive) contexts, use of a multichannel system with no shared local LO can reduce cost, allow more channels to be used for evaluation of data related to a target area, and can, e.g., increase quality of images formed of a target area. For UAV contexts, as another example, a multi-channel system with no shared LOs can reduce the number of analog components (which may be expensive) and can allow wider selection of chips, use of different and possibly lower frequency band chips, etc.

Figure 10A:
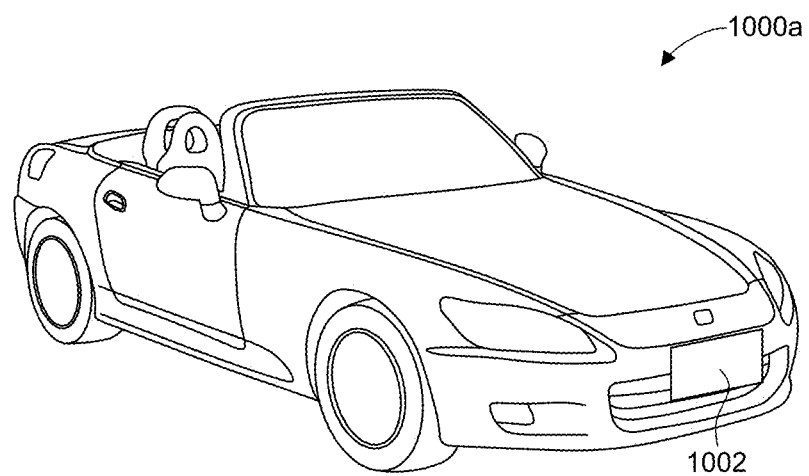
FIG. 10A is a diagram showing a vehicle with a multichannel wireless signaling housing mounted to a center frontal area of the vehicle, in accordance with some embodiments.
Figure 10B:
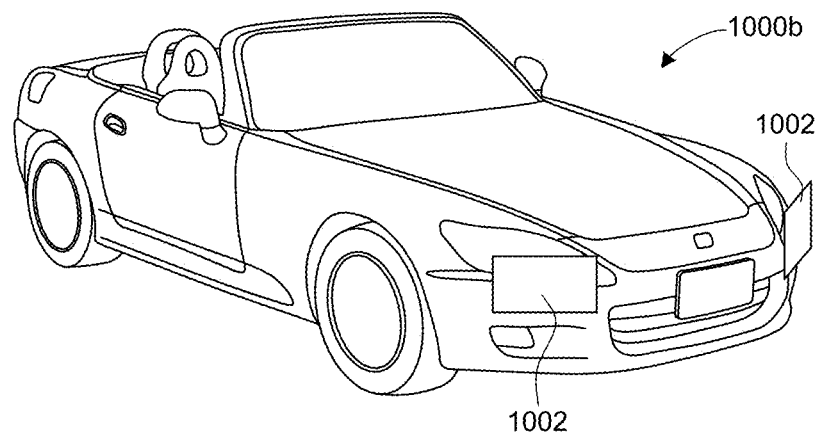
FIG. 10B is a diagram showing a vehicle with a multichannel wireless signaling housing mounted to two side frontal areas of the vehicle, in accordance with some embodiments.

FIG. 10A is a diagram showing a vehicle 1000a with a multichannel wireless signaling housing 1002 mounted to a center frontal area of the vehicle, in accordance with some embodiments. FIG. 10B is a diagram showing a vehicle 1000b with two multichannel wireless signaling systems 1002 mounted to two side frontal areas of the vehicle, in accordance with some embodiments. In the examples of FIGS. 10A and 10B, the vehicles 1000a and 1000b (referred to herein generically as vehicle 1000) comprises a car. The vehicle 1000 may comprise any vehicle, such as a car, truck, plane or other aerial vehicle, motorcycle, bicycle, boat, etc. The vehicle 1000 may comprise a manually driven/piloted vehicle. A manually driven or piloted vehicle, as used herein, may include a vehicle that is driven/piloted with at least some input and/or control by a human being (e.g., is not completely autonomous). In various embodiments, the vehicle 1000 comprises an autonomous vehicle, e.g., a vehicle that is driven/piloted without significant input and/or control by a human being. An autonomous vehicle, may, for instance, be driven/piloted by software, control systems, and/or other techniques that do not involve real-time human input/control.

In the examples of FIGS. 10A and 10B, the vehicles 1000 include one or more multichannel wireless signaling systems 1002 mounted to them. As noted, in the example of FIG. 10A, the multichannel wireless signaling housing 1002 is mounted to a front central area of the vehicle 1000a. For instance, the multichannel wireless signaling housing 1002 may be mounted to a license plate region of the vehicle 1000a. In the example, of FIG. 10B, two multichannel wireless signaling systems 1002 are mounted to two side frontal areas of the vehicle 1000b. Multichannel wireless signaling systems 1002 may be mounted to any area of a vehicle 1000. For instance, multichannel wireless signaling housing 1002 may be incorporated into a portion of a front and/or rear fender of a vehicle 1000, along a side of a vehicle 1000, in a trunk or an engine compartment of a vehicle 1000, anywhere in a frame and/or a chassis of a vehicle 1000, etc. The placement of a multichannel wireless signaling housing 1002 on a vehicle 1000 may depend on an area that is desirable to image or obtain information about. For instance, a multichannel wireless signaling housing 1002 may be placed such that its antennas (discussed further herein) direct a signal toward a region that is to be imaged and/or analyzed for scene information. To image and/or obtain other scene information toward the front, sides, or rear of a vehicle 1000, for instance, it may be desirable to place one or more multichannel wireless signaling systems 1002 on respective front, sides, or rear areas of the vehicle 1000.

Figure 11A:
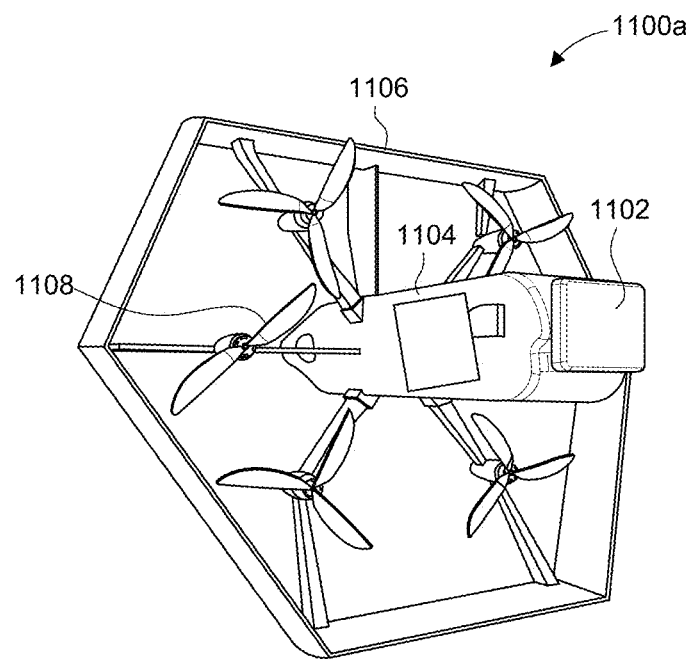
FIG. 11A is a diagram showing a UAV with a multichannel wireless signaling housing mounted to its frame, in accordance with some embodiments.

FIG. 11A is a diagram showing a UAV 1100a with a multichannel wireless signaling housing 1102 mounted to a frame 1104, in accordance with some embodiments. The UAV 1100a includes the multichannel wireless signaling housing 1102, a central frame 1104, an outer frame 1106, and propulsion elements 1108. The central frame 1104 may include motors, power management modules, controllers, etc. for the UAV 1100a. The outer frame 1106 may be secured to the central frame 1104 by one or more coupling elements. The propulsion elements 1108 may include mechanical elements that cause the UAV 1100a to move and may be controlled by one or more elements within the central frame 1104 or anywhere on the UAV 1100a. The propulsion elements 108 are shown in FIG. 11A as propellers, but may include engines (e.g., jet engines) or other systems that cause the UAV 1100a to move. The multichannel wireless signaling housing 1102 may be placed to direct a signal toward a region that is to be imaged and/or analyzed for scene information as noted further herein. In various implementations, the multichannel wireless signaling housing 1102 operates to synchronize internal local oscillators (e.g., those on the same chip and/or those residing on different chips) using various techniques described herein.

Figure 11B:
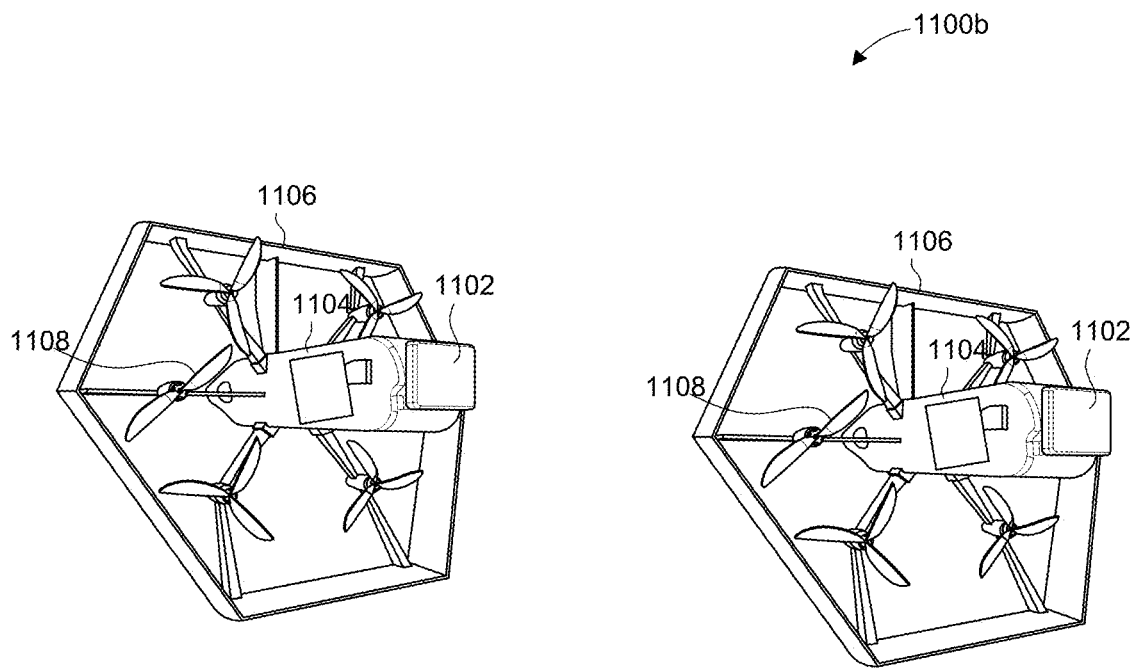
FIG. 11B is a diagram showing a plurality of UAVs with multichannel wireless signaling housing mounted to their frames, in accordance with some embodiments.

FIG. 11B is a diagram showing a plurality of UAVs 1100b with multichannel wireless signaling housings 1102 mounted to their frames 1104, in accordance with some embodiments. In the example of FIG. 11B, the UAVs 1100b include multichannel wireless signaling housings 1102, central frames 1104, outer frames 1106, and propulsion elements 1108. The multichannel wireless signaling housings 1102 may be placed to direct a signal toward a region that is to be imaged and/or analyzed for scene information as noted further herein. In various implementations, the multichannel wireless signaling housings 1102 operate to synchronize their internal local oscillators (despite residing on different chips) using various techniques described herein.

Figure 12:
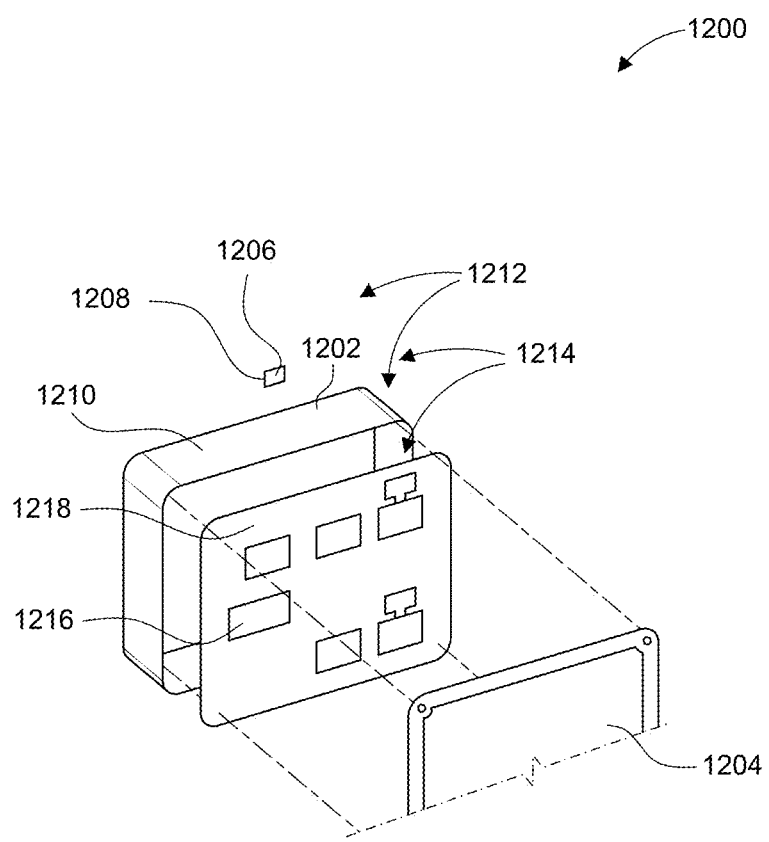
FIG. 12 is a diagram showing a multichannel wireless signaling housing, in accordance with some embodiments.

FIG. 12 is a diagram showing a multichannel wireless signaling housing 1200, in accordance with some embodiments. The diagram of FIG. 12 shows one mechanical arrangement of the components of a multichannel wireless signaling housing and it is noted that various embodiments may have components arranged similarly or differently to those shown in FIG. 12. Some or all of the components of the multichannel wireless signaling housing 1200 may correspond to some or all of the multichannel wireless signaling housing 1000 and/or the multichannel wireless signaling housing 1100, shown in FIGS. 10a, 10b, and 11. The multichannel wireless signaling housing 1200 includes a case 1202 and a cover 1204. The case 1202 and cover 1204 may form an enclosure to enclose the contents therein. The multichannel wireless signaling housing 1200 can further include an oscillator synchronizer 1206, memory 1208, processing unit(s) 1210, antennas 1212, antenna coupling elements 1214 (e.g., transmitters/receivers), and a plurality of oscillators 1216. The oscillator synchronizer 1206, the memory 1208, the processing unit(s) 1210, the antennas 1212, the antenna coupling elements 1214, and/or the plurality of oscillators 1216 may reside within an enclosure formed by the case 1202 and the cover 1204.

In various implementations, the components are enclosed in the multichannel wireless signaling housing 1100 to protect them from contaminants. Contaminants such as moisture, dust, and dirt can interfere with the functioning of electronics. Dust can accumulate to form a thermal or electrical insulating barrier, causing the equipment to overheat, break connectivity, or cause arching. Water can cause short circuits or corrosion. Water can also carry chemicals such as cleaners, surfactants, lubricators, acid, etc. into contact with metals in the electronics. This can cause corrosion.

The multichannel wireless signaling housing 1100 can be designed to prevent the ingress of contaminants by being rated to an ingress protection (IP) level. These range from simple protection that merely prevents large particles from entering, to much higher degrees of seal that prevent keep out liquid, even when the unit is immersed or sprayed with high pressure. Liquid-tight and dust-tight enclosures can be made from a variety of materials, but common materials are metal, which can be machined, cast, brazed, stamped, etc. or plastic, which can be injection molded, 3D printed, etc. Bonded or elastomeric seals are often used to allow the unit to be assembled in pieces, and/or opened after assembly.

Figure 2A:
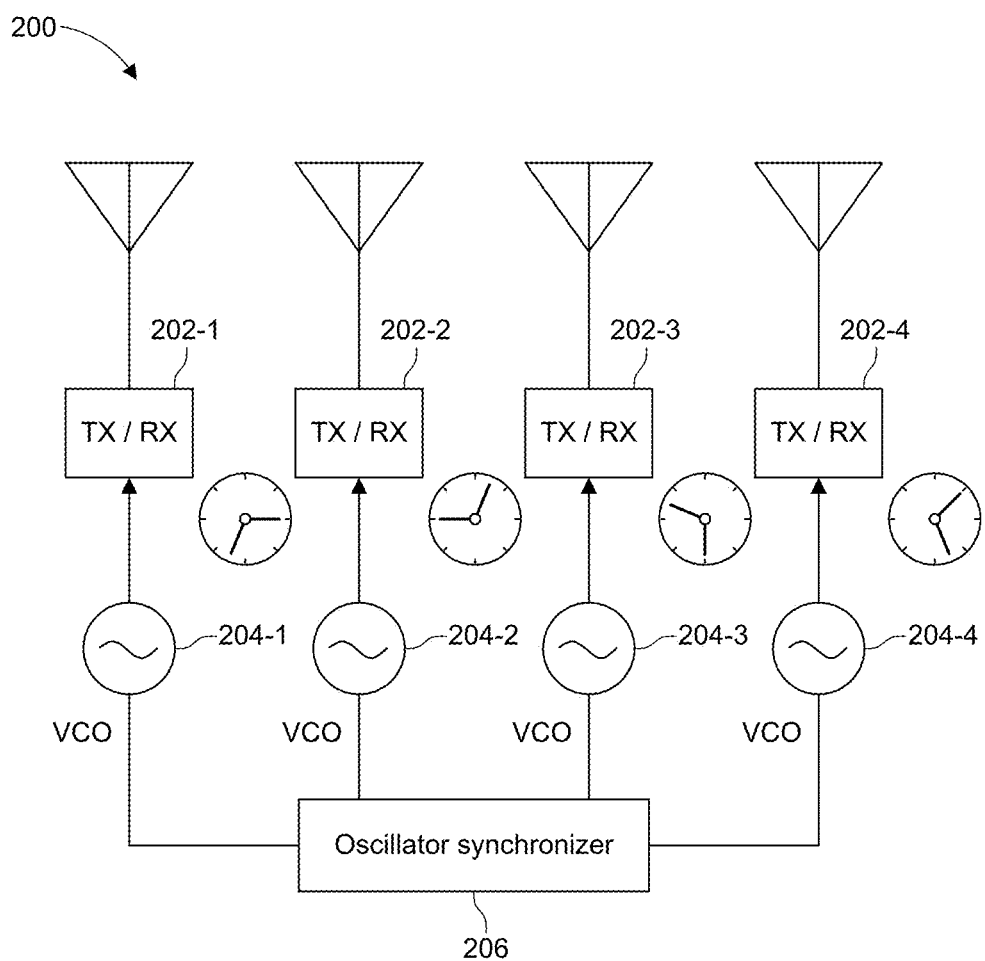
FIG. 2A illustrates an example of a multiple antenna system with independent LOs, in accordance with some embodiments.

FIG. 2A illustrates an example of a radio multiple antenna system 200a with independent LOs 204 and a oscillator synchronizer 206, in accordance with some embodiments. The multiple antenna system 200a includes four transmitter/receiver elements 202-1, 202-2, 202-3, and 202-4 (collectively referred to as the transmitter/receiver elements 202), which are each fed from a corresponding individual VCOs 204-1, 204-2, 204-3, and 204-4 (collectively referred to as the individual VCOs 204). The multiple antenna system 200a further includes the oscillator synchronizer 206. While VCOs are utilized in the multiple antenna system 200a for synchronizing the transmitter/receiver elements 202, any applicable independent oscillator or clock generation circuits can be integrated in the multiple antenna system 200a. Further, while transmitter/receiver elements 202 are shown in FIG. 2A, these elements could be any applicable circuit elements that are capable of being synchronized with each other.

The multiple antenna system 200a does not have a signal path that is shared between an oscillator and multiple antenna elements. For instance, in various embodiments, the multiple antenna system 200a lacks a signal path similar to the signal path 106 of the multiple antenna system 100 shown in FIG. 1. Each of the individual VCOs 204 can be coupled to the corresponding transmitter/receiver element of the transmitter/receiver elements 202 through an unshared coupling that is not shared between the other VCOs 204 and the other transmitter/receiver elements 202. For example, the first transmitter/receiver element 202-1 can be coupled to the first VCO 204-1 through a transmission line that is not coupled to the other transmitter/receiver elements 202-2, 202-3, and 202-4.

Figure 2B:
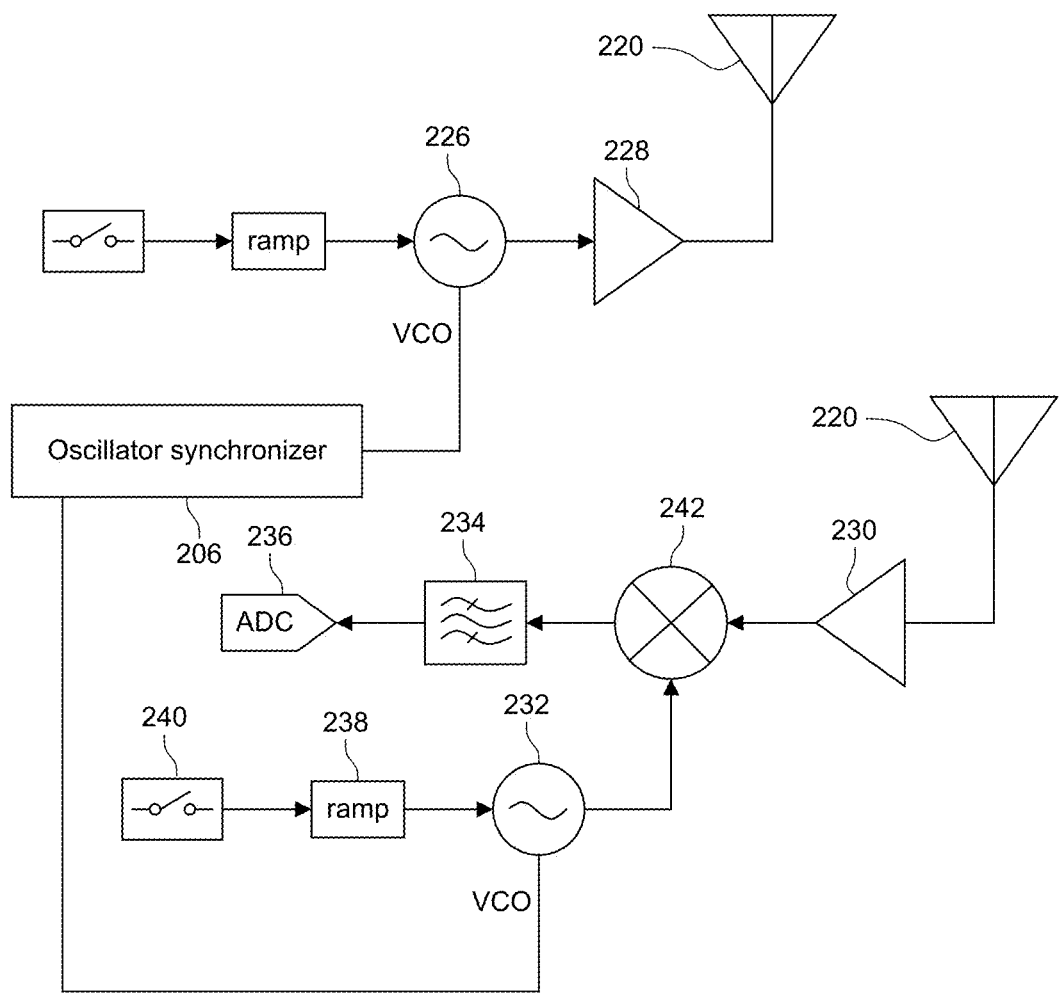
FIG. 2B illustrates an example of a multiple antenna system with independent LOs, in accordance with some embodiments.

It is noted that using a shared LO can create problems with respect to coherent operation of the multiple antenna system 200a. As shown in FIG. 2A, each of the individual VCOs 204 are configured to operate independently. However, in operating independently, the individual VCOs 204 can operate on different oscillator time bases, as represented by the different clocks with different times shown in FIG. 2A. As a result, the transmitter/receiver elements 202 may not operate coherently, e.g. are out of phase with each other, thereby negating the benefits that come with coherent operation. In various implementations, the oscillator synchronizer 206 functions to synchronize the local oscillators 204 such that the local oscillators 204 operate coherently. The oscillator synchronizer 206 also functions to cause the transmitter/receiver elements 202 to operate coherently:

FIG. 2B illustrates an example of a multiple antenna system 200b with independent LOs 226 and 232, in accordance with some embodiments. The multiple antenna system 200b includes a plurality of antennas 220, signal generation elements 222, 224, 238, and 240, the independent LOs 226 and 232, amplifiers 228 and 230, mixing elements 226 and 242, signal filtering elements 234, signal conversion elements 236, and a oscillator synchronizer 206. It is noted that while the example of FIG. 2B shows two antennas 220 and signal paths, various embodiments include any number of antennas and/or antenna elements and/or signal paths.

Figure 2C:
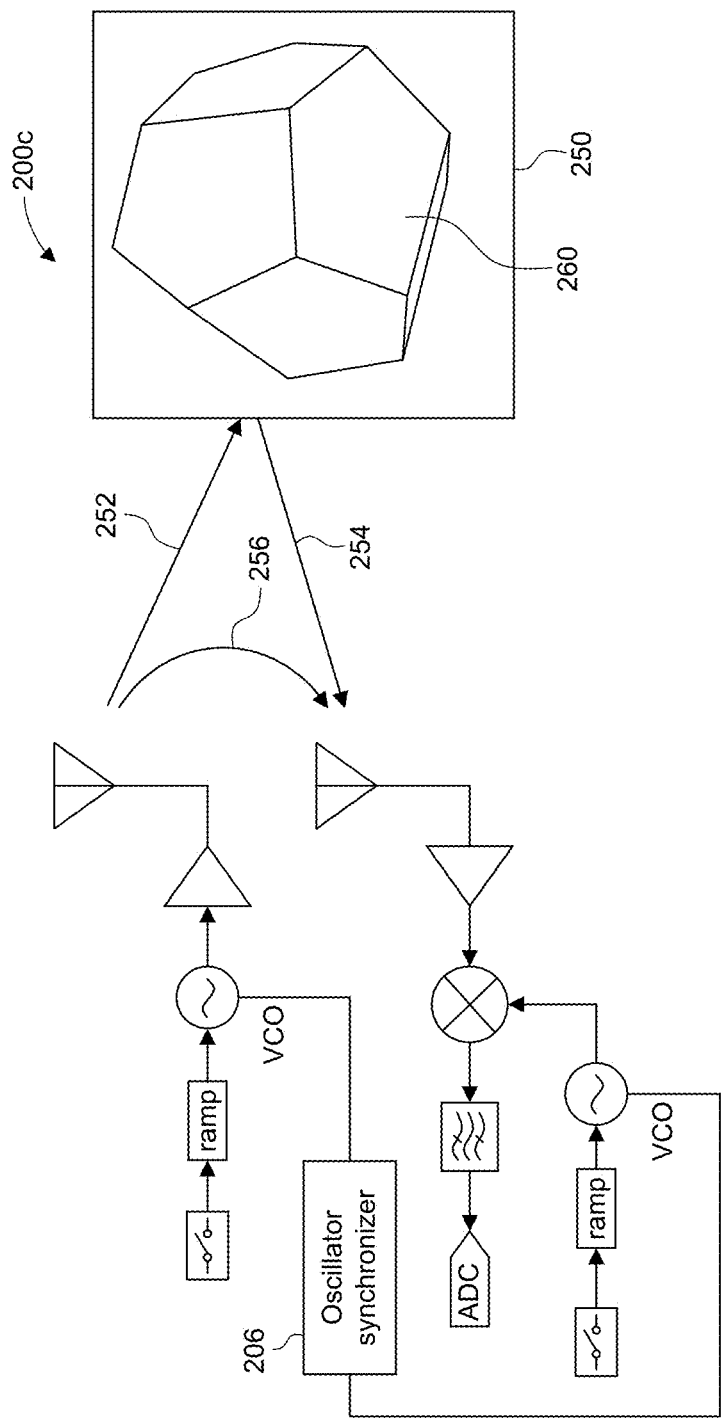
FIG. 2C illustrates an example of a multiple antenna system with independent LOs, where the multiple antennas direct a signal toward a target, in accordance with some embodiments.

FIG. 2C illustrates an example of a multiple antenna system 200c with independent LOs, where multiple antennas direct a signal toward a target region 250, in accordance with some embodiments. The target region 250 may, but need not, contain a target 260. The multiple antenna system 200c may, through its antennas, send a transmit signal 252 toward the target region 250. A receive signal 254 may contain information about contents of the target region 250. An interference signal 256 may represent interaction between antenna elements of the multiple antenna system 200c. As noted herein, a oscillator synchronizer 206 may operate to ensure local oscillators are synchronized based on mutual coupling between antenna elements.

Figure 2D:
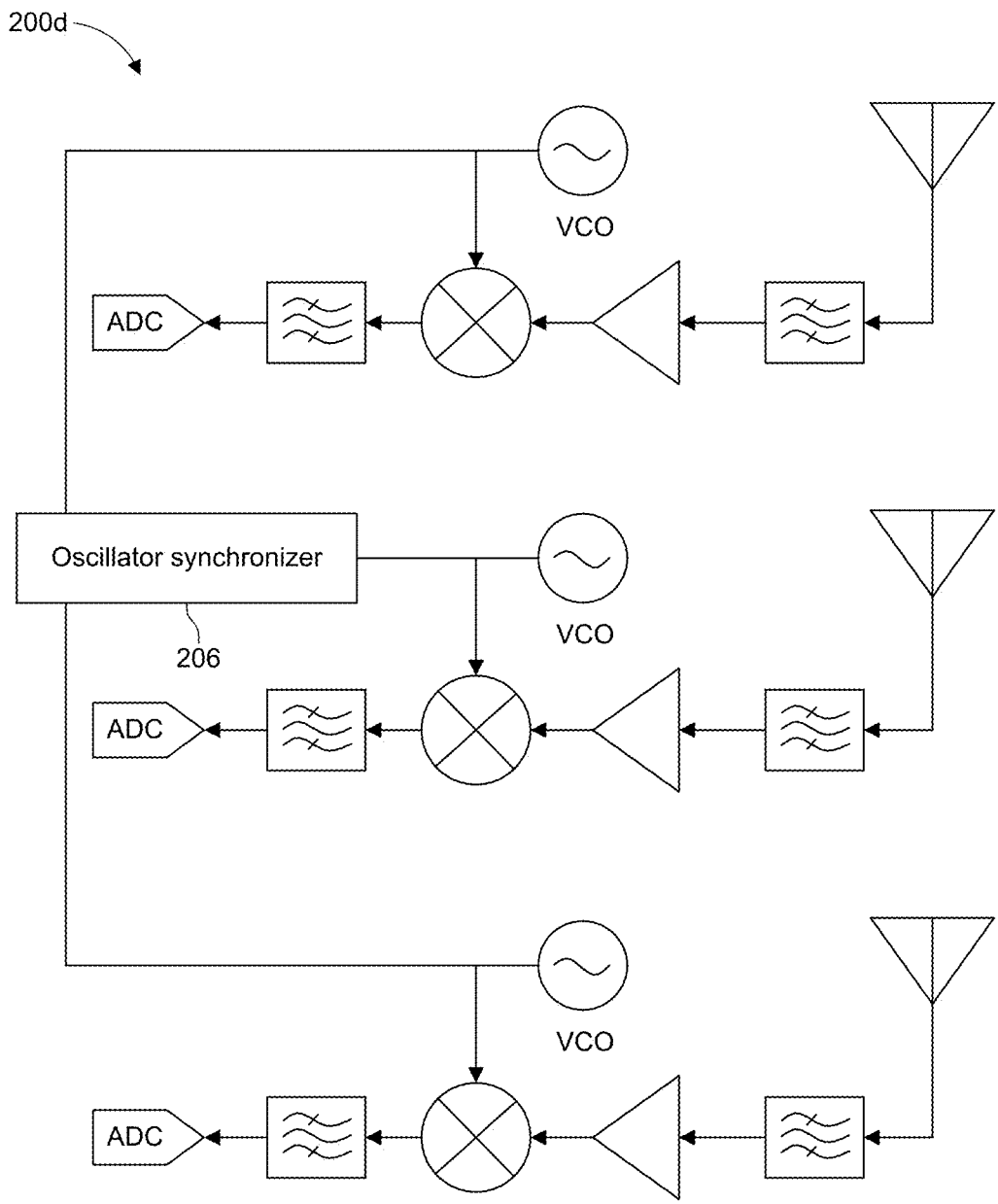
FIG. 2D illustrates an example of a multiple antenna system with a plurality of independent LOs, in accordance with some embodiments.

FIG. 2D illustrates an example of a multiple antenna system 200d with a plurality of independent LOs, in accordance with some embodiments. In the example of FIG. 2D, an oscillator synchronizer 206 is coupled to multiple LOs in a receive path of the system. FIG. 3 illustrates an example of a multichannel wireless signaling system 300a that synchronizes oscillators to provide coherent functioning of elements in the multichannel wireless signaling system 300a, in accordance with some embodiments. Specifically, the multichannel wireless signaling system 300a can synchronize the oscillators based on cross channel leakage measurements between the elements. The multichannel wireless signaling system 300a can be an applicable system for supporting multichannel wireless communications. Specifically, the multichannel wireless signaling system 300a can be implemented in a system that operates in the radio spectrum. For example, the multichannel wireless signaling system 300a can be implemented in a Fifth Generation (5G) cellular network system.

The multichannel wireless signaling system 300a can be implemented in a radar system. For example, the multichannel wireless signaling system 300a can be implemented in a Frequency-Modulated Continuous-Wave (FMCW) radar system. In another example, the multichannel wireless signaling system 300a can be implemented in a radar-based imaging system.

Further, the multichannel wireless signaling system 300a can be incorporated into an applicable system that is capable of functioning with a multichannel wireless signaling system. For example, the multichannel wireless signaling system 300a can be incorporated into one or more of an automobile, a unmanned aerial vehicle (UAV), a search system, a military radar system, a radio transceiver, a radio telescope. In another example, the wireless signaling system 300a can be incorporated into one or more of a video encoding processor, a machine learning accelerator, and a software-defined radio.

The multichannel wireless signaling system 300a includes a first antenna 302-1 and a second antenna 302-2 (collectively referred to as the antennas 302). The first and second antennas 302-1 and 302-2 function according to an applicable antenna in a wireless signaling system in either transmitting and/or receiving wireless signals. For example, the antennas 302 can be multiple-input multiple-output (MIMO) antennas. In another example, the antennas 302 can be configured to perform antenna beamforming. While only two antennas are shown in the multichannel wireless signaling system 300a, the multichannel wireless signaling system 300a can include more than two antennas.

The multichannel wireless signaling system 300a includes a first oscillator 304-1 and a second oscillator 304-2 (collectively referred to as the oscillators 304). The oscillators 304 can be applicable electronic oscillators. For example, the oscillators 304 can be formed through VCOs. While only two oscillators are shown in the multichannel wireless signaling system 300a, the multichannel wireless signaling system 300a can include more than two oscillators.

The oscillators 304 can reside at an applicable location, e.g. in one or more component(s), of the multichannel wireless signaling system 300a. For example, the first oscillator 304-1 and the second oscillator 304-2 can reside on a single chip in the multichannel wireless signaling system 300a. In another example, the first oscillator 304-1 and the second oscillator 304-2 can reside on different chips in the multichannel wireless signaling system 300a. In yet another example, the plurality of oscillators 304 can include more than two oscillators that each reside on different chips in the multichannel wireless signaling system 300a. In another example, the plurality of oscillators 304 can include more than two oscillators that all reside on the same chip in the multichannel wireless signaling system 300a. In yet another example, the plurality of oscillators 304 can include multiple oscillators on different chips and two or more of the oscillators reside on a single chip of the plurality of different chips.

Figure 3A:
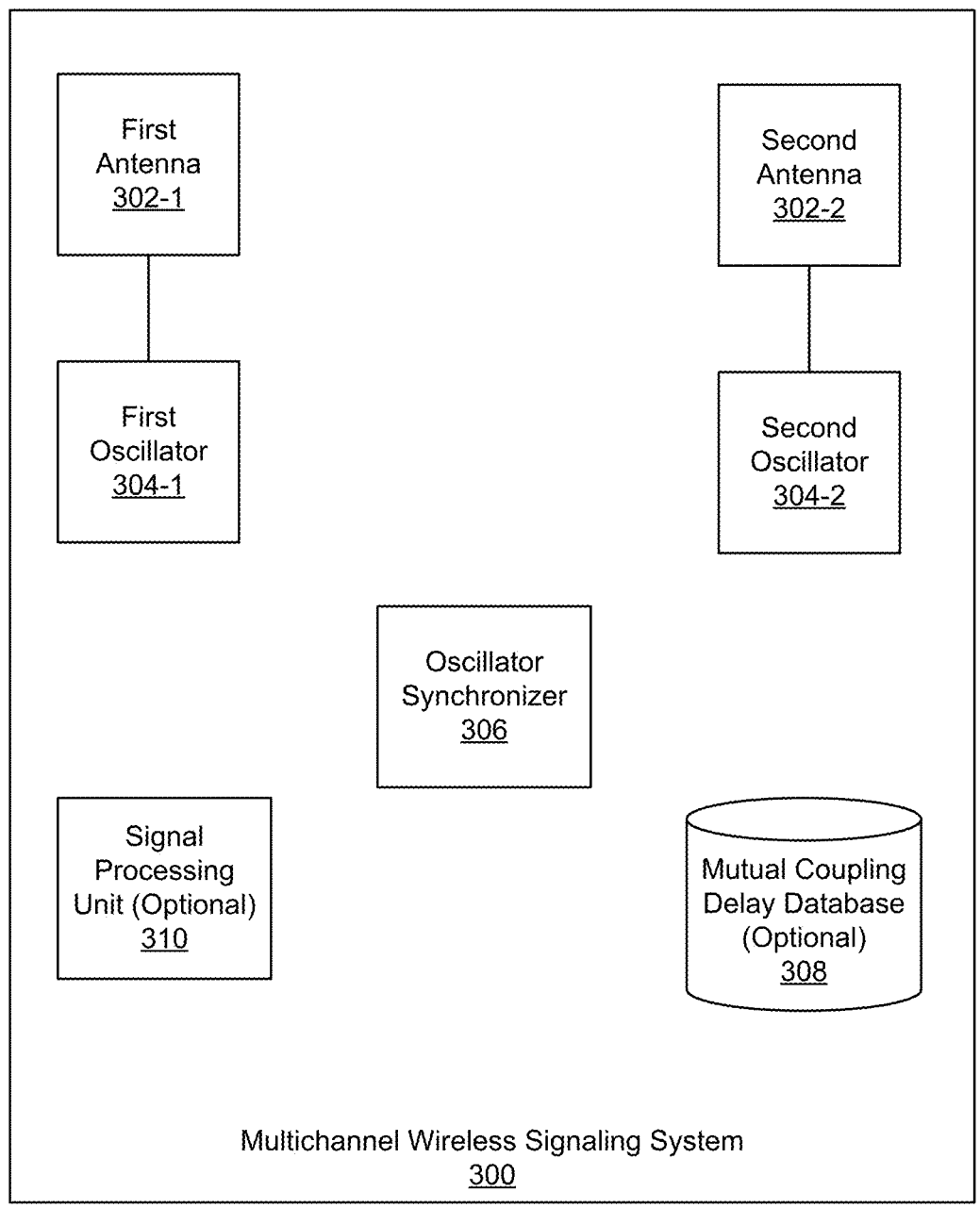
FIG. 3A illustrates an example of a multichannel wireless signaling system 300a that synchronizes oscillators to provide coherent functioning of elements 300a, in accordance with some embodiments.

In the example multichannel wireless signaling system 300a shown in FIG. 3A, the first oscillator 304-1 is coupled to the first antenna 302-1 and the second oscillator 304-2 is coupled to the second antenna 302-2. The oscillators 304 can be coupled to the corresponding antenna of the antennas 302 through an applicable coupling mechanism. Specifically, the first oscillator 304-1 can be coupled to the first antenna 302-1 through a first transmission line and the second oscillator 304-2 can be coupled to the second antenna 302-2 through a second transmission line. The transmission lines can be formed through one or more applicable circuit elements for transferring energy between the corresponding oscillators 304 and the corresponding antennas 302. For example, the transmission lines can be formed through either or both microstrips and planar waveguides.

The first oscillator 304-1 can be coupled to the first antenna 302-1 such that the output of the first oscillator 304-1 directly affects operation of the first antenna 302-1 while not directly affecting operation of the second antenna 302-2. The second oscillator 304-2 can be coupled to the second antenna 302-2 such that the output of the second oscillator 304-2 directly affects operation of the second antenna 302-2 while not directly affecting operation of the first antenna 302-1. Further, the first oscillator 304-1 can be operated independently from the second oscillator 304-2 and vice versa. Effectively, the first oscillator 304-1 and the second oscillator 304-2 can be independently controlled to directly affect the operation of the corresponding first antenna 302-1 and the corresponding second antenna 302-2. For example, the first oscillator 304-1 can provide a clock signal back to one or more elements associated with the first antenna 302-1 while refraining from providing the clock signal back to one or more elements associated with the second antenna 302-2. Likewise, the second oscillator 304-2 can provide a clock signal back to one or more elements associated with the second antenna 302-2 while refraining from providing the clock signal back to one or more elements associated with the first antenna 302-1.

As will be discussed in greater detail later, the first oscillator 304-1 can indirectly affect operation of the second antenna 302-2. Specifically, the second oscillator 304-1 can be synchronized with the first oscillator 304-1 such that the first oscillator 304-1 indirectly affects operation of the second antenna 302-2. Similarly, the second oscillator 304-2 can indirectly affect operation of the first antenna 302-1. Specifically, the first oscillator 304-1 can be synchronized with the second oscillator 304-2 such that the second oscillator 304-2 indirectly affects operation of the first antenna 302-1.

The multichannel wireless signaling system 300a includes an oscillator synchronizer 306. The oscillator synchronizer 306 functions to perform a synchronization of a time base of the first oscillator 304-1 to a time base of the second oscillator 304-2, as part of synchronizing the first oscillator 304-1 with the second oscillator 304-2. By synchronizing the first oscillator 304-1 with the second oscillator 304-2, the oscillator synchronizer 306 can effectively cause the coherent operation of the first antenna 302-1 and the second antenna 302-2. Specifically, by synchronizing the first oscillator 304-1 with the second oscillator 304-2, the first antenna 302-1 and the second antenna 302-2 can operate in-phase with each other during the operation of the multichannel wireless signaling system 300a. In using the oscillator synchronizer 306 and the plurality of oscillators 304 to control operation of the first antenna 302-1 and the second antenna 302-2, coherent operation of the antennas 302 can be achieved without the use of a single master LO. In turn, this can eliminate the need to route a single master LO signal throughout the multichannel wireless signaling system 300a, thereby reducing both costs and design complexity of the multichannel wireless signaling system 300a.

The oscillator synchronizer 306 can be implemented at an applicable location in the multichannel wireless signaling system 300a for synchronizing the oscillators 304. Specifically, the oscillator synchronizer 306 can be implemented between the antennas 302 and the oscillators 304. Specifically, the oscillator synchronizer 306 can be implemented between the first oscillator 304-1 and the first antenna 302-1. More specifically, the oscillator synchronizer 306 can reside within a transmission processing unit coupling the first antenna 302-1 to the first oscillator 304-1, or a reception processing unit coupling the first antenna 302-1 to the first oscillator 304-1.

While the multichannel wireless signaling system 300a is shown as having a single oscillator synchronizer 306, the multichannel wireless signaling system 300a can have more than one oscillator synchronizer. The number of oscillator synchronizers included in the multichannel wireless signaling system 300a can scale with the number of antennas and/or oscillators that are included in the multichannel wireless signaling system. For example, the multichannel wireless signaling system 300a can include a third antenna, a third oscillator, and a second oscillator synchronizer. Further in the example, the second oscillator synchronizer can synchronize the third oscillator with either the first oscillator 304-1 or the second oscillator 304-2. Specifically, the second oscillator synchronizer can synchronize a time base of the third oscillator with a time base of either the first oscillator 304-1 or the second oscillator 304-2. As a result, the third antenna can operate coherently with the antennas 302.

The antennas 302 can be part of antenna pairs in the multichannel wireless signaling system 300a. Further, the oscillators 304 can be part of oscillator pairs in the multichannel wireless signaling system 300a. Oscillator pairs can correspond to antenna pairs. In turn, oscillators in an oscillator pair can correspond to specific antennas in a corresponding antenna pair. Further, oscillator pairs can be synchronized with other oscillators and/or oscillator pairs. Additionally, oscillators in an oscillator pair can be synchronized with each other.

The multichannel wireless signaling system 300a can form a multiple-input multiple-output (MIMO) wireless signaling system. Specifically, one of the first oscillator 304-1 and the second oscillator 304-2 can function as a leader oscillator while the other oscillator functions as a follower oscillator. Further, one of the first antenna 302-1 and the second antenna 302-2 can function as a leader MIMO antenna while the other antenna functions as a follower antenna. Additionally, the oscillator synchronizer 306 can function as a follower oscillator by synchronizing a follower oscillator with one or more leader oscillators.

The oscillator synchronizer 306 can synchronize the first oscillator 304-1 with the second oscillator 304-2 based on a mutual coupling between two or more applicable elements in the multichannel wireless signaling system. Specifically, the oscillator synchronizer 306 can synchronize the first oscillator 304-1 with the second oscillator 304-2 based on a mutual coupling between the first antenna 302-1 and the second antenna 302-2. A mutual coupling between applicable elements in the multichannel wireless signaling system 300a, e.g. the antennas 302, can include measurements or representations of one or more applicable interactions between the elements in the multichannel wireless signaling system 300a. Such interactions can be represented by a mutual coupling signal that is ultimately used in synchronizing the oscillators 304.

The disclosure now continues with a discussion of operation principles of oscillators and how oscillators can be synchronized based on coupling between different elements. An oscillator v can be characteristics by both a frequency of oscillation and the phase of a waveform, as shown in Equation 1.

$$v(t) = e^{j(\omega t + \phi)} \quad \text{Equation 1}$$

Here, the angular frequency represented by co in radians per second and the phase is represented by $\phi$ in radians. In a situation with two independently operating oscillators, as shown by Equations 2 and 3, the oscillators can different frequencies and phases:

$$v_1(t) = e^{j(\omega_1 t + \phi_1)} \quad \text{Equation 2}$$

$$v_2(t) = e^{j(\omega_2 t + \phi_2)} \quad \text{Equation 3}$$

In order to synchronize the oscillators, a correction factor $\Delta\omega$ for frequency and a correction factor of $\Delta\phi$ for phase can be applied as shown in Equations 4 and 5 below.

$$\omega_2 = \omega_1 + \Delta\omega \quad \text{Equation 4}$$

$$\phi_2 = \phi_1 + \Delta\phi \quad \text{Equation 5}$$

Specifically, these correction factors can be applied to the signal from one oscillator to obtain a signal that is synchronized to the other oscillator, as is shown in Equation 6. More specifically, to synchronize oscillator $v_2$ to oscillator $v_1$, oscillator $v_2$ can be multiplied by a sinusoid containing the correction factors.

$$v_1(t) = v_2(t) e^{j(\Delta\omega t + \Delta\phi)} \quad \text{Equation 6}$$

Once the two oscillators are synchronized, two circuit elements located in different parts of the circuit and uniquely associated with the corresponding oscillators will be in synchronization if one is observing $v_1$ and the other is observing the corrected version of $v_2$. For example, an antenna coupled to $v_1$ will be in synchronization with an antenna coupled to $v_2$. Based on this technique, correction factors for a plurality of oscillators in the circuit can be identified, thereby facilitating the synchronization of multiple elements coupled to the oscillators in the circuit.

In synchronizing oscillators, an assumption can be made that once the correction factors $\Delta\omega$ and $\Delta\phi$ are found, the factors can remain constant, e.g. within a certain threshold, for a specific amount of time. This is a steady-state assumption that is familiar from basic AC electronics. This amount of time can be referred to as the "calibration window." At the end of the calibration window, a new set of correction factors that are valid for an amount of time can be identified, and so on. The length of this calibration window can depend on a number of applicable parameters including the parameters of the components used in a particular circuit, process characteristics, and/or the strictness of the timing requirements of a particular application, etc.

These correction factors can be identified based on mutual couplings between various elements, e.g. the antennas 302, in the multichannel wireless signaling system. With respect to antennas, the mutual coupling between the antennas can be describable by the leakage between the antennas. Specifically, mutual coupling between antennas can be a parasitic signal that arises when the antennas are placed close to each other. Usually this is undesirable, because it creates deviations from ideal circuit behavior. For example, in an array of antennas designed to scan, it may create places where the antenna array is unable to be scanned, rendering it "blind". In another example, mutual coupling can produce crosstalk between signals.

Mutual coupling can be described by the principle of conservation of energy. When one antenna is excited, some of the energy is propagated (or absorbed if the antenna is receiving). However antennas are not perfectly efficient, and the remaining energy that is not propagated or absorbed should be dissipated somehow. One path for dissipation is to an adjacent antenna, where the energy excites the adjacent antenna, thereby causing coupling between the antennas. The effect then can continue as additional adjacent antennas are excited and the effect propagates throughout at least a portion of an antenna array. The effect can be seen as antennas leaking their signal into each other. By the reciprocity principle of antennas, this mutual coupling effect can occur equally when an antenna is being driven to transmit or when receiving an incoming wave.

Further, mutual coupling mechanisms can be described as the combination of direct path and surface waves. The direct path is the leakage between antenna elements through the air or the surrounding medium to the circuit or the multichannel wireless signaling system 300a. Surface waves are caused by the electromagnetic waves getting trapped in elements of the circuit due to the permittivity differences between the element substrate and the surrounding medium. Those trapped waves can propagate throughout the array of elements exciting elements that are close to each other. This is the main coupling mechanism for elements that are close to each other. For elements further away the direct path will dominate. The result is that the mutual coupling signal will take a path that depends on circuit geometry, but that is not necessarily the direct geometrical path length. The path taken by the mutual coupling signal can be described by the mutual coupling path length.

From a signal processing standpoint, mutual coupling can appear as a signal that leaves the transmitter and is immediately received back at the receiver. Normally this is undesirable, as this signal did not interact with the environment, travel across the communication channel, or otherwise perform the intended purpose of the circuit. However, for the purposes of the embodiments herein, this signal is very useful because it carries information about the frequency and phase offset of the oscillator which ultimately led to its production.

In a receiver, filtering can be used to separate the mutual coupling signal from the desired information-bearing signal. The signals can be filtered in time, frequency, amplitude, phase and/or any other suitable method of distinguishing signals. For example, a radar unit may be designed to see targets hundreds to thousands of meters away. The mutual coupling signal may appear as a peak at a distance of a few centimeters. Since this signal is the shortest-range signal the radar sees, or is below the minimum range at which the radar is designed to operate, it may have originated from mutual coupling.

In some embodiments, it can be assumed that after filtering the received signals, the signal detected with the shortest range is the mutual coupling signal. In some embodiments, the distance between antennas in the array can be known ahead of time and an estimate of the mutual coupling path length is made, for example by direct measurement, full-wave electromagnetic simulation, or some other technique. Once an estimate of the mutual coupling path length is known, the system can search for a peak at or near the estimated path length and identify such peak as the mutual coupling.

The mutual coupling used by the oscillator synchronizer in synchronizing the first oscillator 304-1 and the second oscillator 304-2 can include one or more of an electromagnetic propagation delay due to an interaction between the antennas, a phase shift introduced by the interaction, an internal delay due to a transmit signal path, an internal delay due to a receive signal path, a difference in trigger times between the first oscillator 304-1 and the second oscillator 304-2, a difference in start frequencies between the first oscillator 304-1 and the second oscillator 304-2, and a difference in initial phases between the first oscillator and the second oscillator.

The mutual coupling can include an intra-chip delay due to the interaction between the first antenna 302-1 and the second antenna 302-2. Further, the mutual coupling can include a parasitic effect due to locations of the first antenna 302-1 and the second antenna 302-2 in the multichannel wireless signaling system 300a. Additionally, the mutual coupling can include an amount of energy from either the first antenna 302-1 or the second antenna 302-2 that is absorbed by the corresponding other antenna. Further, the mutual coupling can include an antenna signal path delay of a chip that includes the oscillator synchronizer 306. Additionally, the mutual coupling can include an antenna transmission line delay associated with either or both a transmission line coupled to the first oscillator 304-1 and a transmission line coupled to the second oscillator 304-2. Further, the mutual coupling can include a delay associated with either or both the first antenna 302-1 and the second antenna 302-2 themselves.

Specifically, an example multichannel wireless signaling system can include an array of A transmitters and B receivers, the total number of channels is K=AB. For the $k^{th}$ channel where k=1, 2, ... K, there is a direct path signal from transmitter a to receiver b due to mutual coupling. If the transmitter is using a first oscillator and the receiver is using a second oscillator, the direct path signal can be a combination of:

The mutual coupling path length from the transmit antenna to the receive antenna, an electromagnetic propagation delay $\tau_{d_k}$ seconds. Note that this not necessarily the direct geometric path length as discussed earlier. A method for measuring the mutual coupling path length is given below;

The phase shift introduced by the mutual coupling $\phi_{c_k}$ in radians, which is obtained e.g. from the measured or simulated S-parameters;

The internal delays of the transmit signal path $\tau_{tx_k}$. This is the propagation delay through all of the components of the transmit path after the signal leaves the oscillator: mixer, transmission lines, filters, amplifiers, etc;

The internal delays of the receive signal path $\tau_{rx_k}$. This is the propagation delay through all of the components of the receive path after the signal enters the chip at the antenna input port. As before this includes delays from the mixer, transmission lines, filters, amplifiers, etc;

The difference in start/trigger time between the two oscillators $\Delta\tau_{tr_k}$;

The difference between the oscillators' start frequencies $\Delta f_k$;

The difference in initial phase of the oscillators between the transmitter and the receiver of the $m^{th}$ channel $\Delta\phi_k$.

The discussion now continues with a discussion of identifying correction factors for a FMCW radar system. While this discussion is focused on a FMCW radar system, it is appreciated that this can be applied to an applicable electronic system that requires synchronization across components to a single shared time base. For an FMCW radar transmitting chirps with slew rate α Hz/second, this direct path signal for the $k^{th}$ channel can be written in terms of the above as shown in Equation 7 below.

$$z_k(t)=\exp(j2\pi[\alpha(\tau_{d_k}+\tau_{tx_k}+\tau_{rx_k}+\Delta\tau_{tr_k})+\Delta f_k]t)\exp(j2\pi(f_c+f_k)(\tau_{d_k}+\tau^{rx}{}_k+\tau_{rx_k}+\Delta t_{tr_k})+j\phi_{c_k}+j\Delta\phi_k) \quad \text{Equation 7}$$

In Equation 7, the first complex exponential represents the frequency error term due to the delays enumerated above. The second complex exponential represents the phase error term. These error terms can be combined to represent the signal as shown in Equation 8.

$$z_k(t)=s_k(t)\exp(j2\pi(f_{error}t+\phi_{error})) \quad \text{Equation 8}$$

$$f_{error}=\alpha(\tau_{d_k}+\tau_{tx_k}+\tau_{rx_k}\Delta\tau_{tr_k})+\Delta f_k \quad \text{Equation 9}$$

$$\phi_{error}=2\pi f_c(\tau_{d_k}+\tau_{tx_k}+\tau_{rx_k}+\Delta\tau_{tr_k})+\pi_{c_k} \quad \text{Equation 10}$$

Where $s_m(t)$ is the ideal direct path response of the $k^{th}$ channel. Equation 8 shows that the effect of all delay sources can be eliminated if (a) the ideal direct path response is known, for example from simulation or experimental measurement, and (b) the frequency error, as shown in Equation 9, and the phase error, as shown in Equation 10, are measured for each channel. The mutual coupling signal can be used to measure $f_{error}$ and $\phi_{error}$, so this demonstrates how the mutual coupling signal can be used to calibrate out all sources of error between two independent LOs.

The internal delays described above measure the analog signal path delays of the transmit and receive channels inside the chip. There are two other delays associated with each transmit/receive channel outside the chip: the antenna transmission line delay and the delay associated with the antenna itself. Depending on the circuit design, these can either be neglected if small or precisely quantified via simulation and then subtracted as a correction to $\tau_{tx_k}$ and $\tau_{rx_k}$.

The oscillator synchronizer 306 can synchronize the first oscillator 304-1 and the second oscillator 304-2 based on oscillator properties of either or both the first oscillator 304-1 and the second oscillator 304-2. Oscillator properties of an oscillator can include applicable properties related to the operation of the oscillator. For example, oscillator properties of an oscillator can include a frequency of an output of the oscillator and a waveform phase of the output of the oscillator. The oscillator properties can be included in part of a mutual coupling signal representing a mutual coupling between the first antenna 302-1 and the second antenna 302-2.

In synchronizing the first oscillator 304-1 and the second oscillator 304-2, the oscillator synchronizer 306 can synchronize the oscillators 304 based on both a mutual coupling between the antennas 302 and the oscillator properties of either or both the first oscillator 304-1 and the second oscillator 304-2. Specifically, the oscillator synchronizer 306 can identify changes to make to the first oscillator 304-1, based on the oscillator properties and the mutual coupling between the antennas 302, in order to synchronize the first oscillator 304-1 with the second oscillator 304-2. For example, the oscillator synchronizer 306 can cause the frequency of the first oscillator 304-1 to change from its current frequency, as indicated by the oscillator properties of the first oscillator, based on the mutual coupling between the antennas 302. In another example, the oscillator synchronizer 306 can cause the phase of the first oscillator 304-1 to change from its current phase, as indicated by the oscillator properties of the first oscillator, based on the mutual coupling between the antennas 302.

The oscillator synchronizer 306 can measure a mutual coupling, e.g. a mutual coupling signal, between the first antenna 302-1 and the second antenna 302-2. Further, the oscillator synchronizer 306 can identify oscillator properties of either or both the first oscillator 304-1 and the second oscillator 304-2. For example, the oscillator synchronizer 306 can identify the oscillator properties of the first oscillator 304-1 based on a mutual coupling signal received at the second antenna 302-2.

The oscillator synchronizer 306 can measure a mutual coupling between the first antenna 302-1 and the second antenna 302-2 based on signals received at either the first antenna 302-1 and the second antenna 302-2. Such signals can be transmitted by the corresponding other antenna. For example, the oscillator synchronizer 306 can measure a mutual coupling between the antennas 302 based on a signal that is transmitted form the second antenna 302-2 and received at the first antenna 302-1. In measuring a mutual coupling based on a signal received at one of the antennas 302, the oscillator synchronizer 306 can measure the mutual coupling based on a range property in a representation of the received signal. Further, the oscillator synchronizer 306 can measure the mutual coupling based on a range property in a filtered representation of the received signal. For example, the oscillator synchronizer 306 can filter a signal received at the first antenna 302-1 and detect the mutual coupling between the antennas 302 based on a range property in the filtered signal.

The example multichannel wireless signaling system 300a shown in FIG. 3A optionally includes a mutual coupling delay database 308. While the mutual coupling delay database 308 is shown as residing at the multichannel wireless signaling system 300a, the mutual coupling delay database 308 can be implemented remote from the multichannel wireless signaling system 300a. The mutual coupling delay database 308 includes data indicating determined mutual couplings between elements, e.g. antennas 302. For example, the oscillator synchronizer 306 can measure a mutual coupling between the antennas 302 and add an entry into the mutual coupling delay database 308 indicating the measured mutual coupling between the antennas 302. As follows, the oscillator synchronizer 306 can synchronize the oscillators 304 based on one or more entries in the mutual coupling delay database 308 that indicate mutual coupling(s) associated with the multichannel wireless signaling system 300a.

In synchronizing the oscillators 304 based on data stored in the mutual coupling delay database 308, the oscillator synchronizer 306 can gather delay values estimating one or more known delays due to the interaction between the antennas 302. For example, the oscillator synchronizer 306 can gather values that estimate a transmission line delay caused by the interactions between the antennas 302. Based on, the estimated delay(s), the oscillator synchronizer 306 can generate a mutual delay signal, which can be applied in synchronizing the oscillators 304.

The oscillator synchronizer 306 can synchronize the oscillators 304 based on an occurrence of one or more specific events associated with the multichannel wireless signaling system 300a. For example, the oscillator synchronizer 306 can synchronize the oscillators 304 when the antennas 302 as part of a beamforming operation. Further, the oscillator synchronizer 306 can synchronize the oscillators 304 based on time or periodicity. For example, the oscillator synchronizer 306 can synchronize the oscillators 304 every minute during operation of the multichannel wireless signaling system 300a. In another example, the oscillator synchronizer 306 can receive a time signal representing a calibration interval or calibration window. In turn, the oscillator synchronizer 306 can synchronize the oscillators 304 at the calibration interval or within the calibration window. Additionally, the oscillator synchronizer 306 can synchronize the oscillators 304 based on a power state of the multichannel wireless signaling system 300a. Specifically, the oscillator synchronizer 306 can synchronize the oscillators based on a power state of the multichannel wireless signaling system 300a with respect to one or more threshold power levels for the multichannel wireless signaling system 300a.

The example multichannel wireless signaling system 300a shown in FIG. 3A also optionally includes a signal processing unit 310. The signal processing unit 310 can be coupled to the oscillator synchronizer 306 and control operation of the oscillator synchronizer 306 in synchronizing the oscillators 304. Specifically, the signal processing unit 310 can include a frequency synthesizer, such as a ramp generator, and an analog-to-digital converter (ADC). As will be discussed in greater detail later, the signal processing unit 310 can measure delay times across different chips in the multichannel wireless signaling system. As follows, the oscillator synchronizer 306 can account for these delay times when synchronizing the oscillators 304.

The disclosure now continues with a more detailed description of how correction factors for synchronizing oscillators are determined based on mutual coupling between elements. Specifically, these techniques can be implemented by the oscillator synchronizer 306 to adjust properties of one of the oscillators 304 as part of synchronizing the oscillators 304 based on mutual coupling between the antennas 302.

Figure 3B:
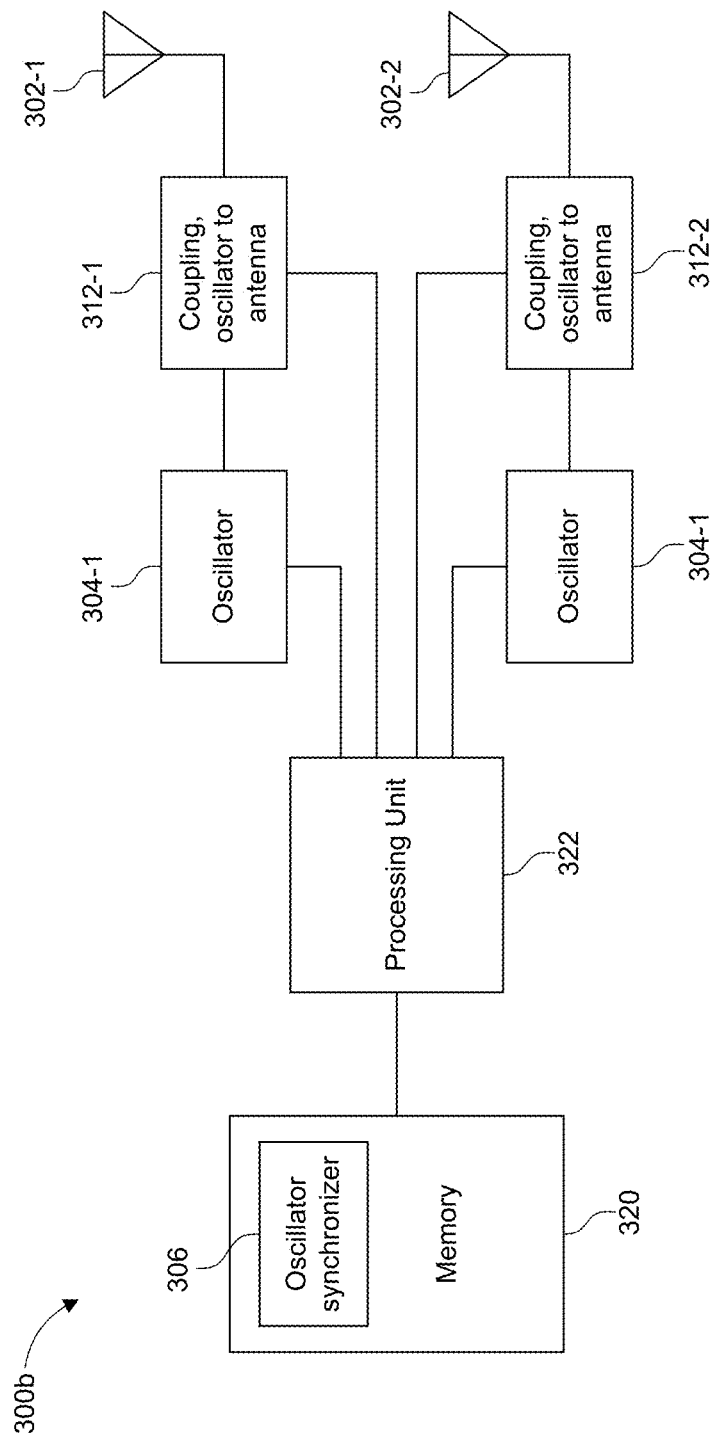
FIG. 3B illustrates an example of a multichannel wireless signaling system that synchronizes oscillators to provide coherent functioning of elements, in accordance with some embodiments

FIG. 3B illustrates another example of a multichannel wireless signaling system 300b that synchronizes oscillators to provide coherent functioning of elements, in accordance with some embodiments. The multichannel wireless signaling system 300b includes antenna elements 302-1 and 302-2, oscillators 304-1 and 304-2, antenna coupling elements 312-1 and 312-2 (e.g., transmitters/receivers), a processing unit 322, memory 320, and an oscillator synchronizer 306. The oscillator synchronizer 306 may perform some or all of the functions of the oscillator synchronizer 306 in FIG. 3A; those functions are hereby incorporated by reference as if set forth fully herein.

Figure 4:
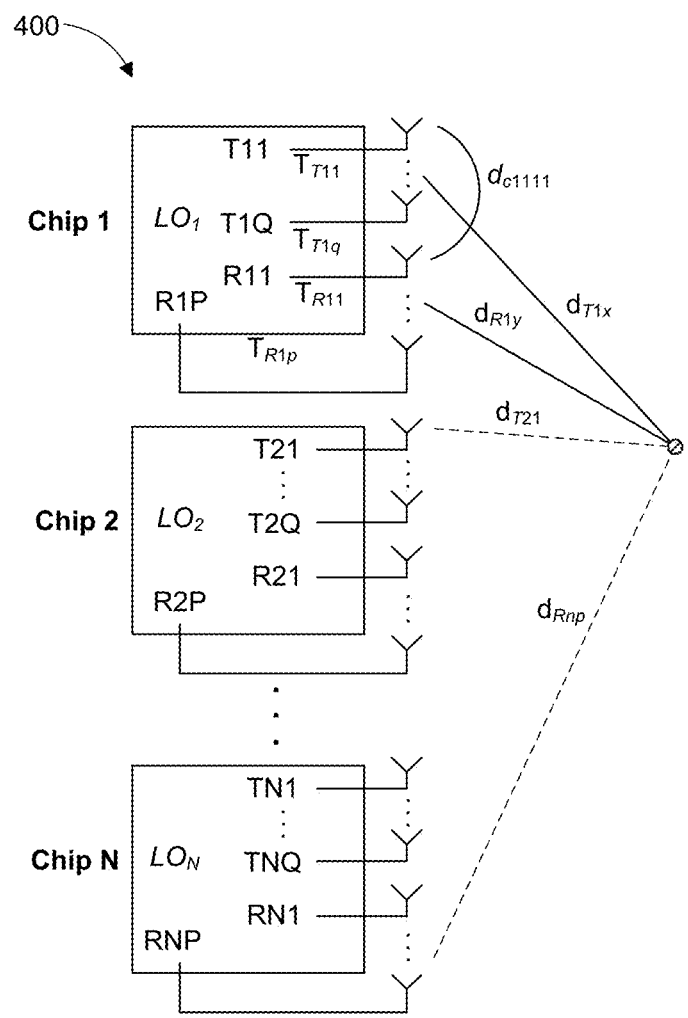
FIG. 4 illustrates an example FMCW radar system, in accordance with some embodiments.

The discussion regarding how to determine the correction factors is made with reference to an example FMCW radar system 400 shown in FIG. 4.

The technique for identifying the correction factors for synchronizing oscillators can take place in two steps. In the first step, a calibration is performed before the FMCW radar system 400 is actually operated in performing radar operations, e.g. imaging operations. This calibration is referred to herein as an offline calibration. The offline calibration can take place in an applicable environment. For example, the offline calibration can be performed at a factory of the FMCW radar system 400. In another example, the offline calibration can take place in an anechoic chamber. The purposes of the offline calibration is to measure the mutual coupling path lengths for channels in the FMCW radar system 400.

A channel, as used herein, includes the combination of one transmit antenna and one receive antenna in a multi-channel wireless signaling system. With reference to the FMCW radar system 400 shown in FIG. 4, the system 400 is implemented as a collection of N chips, each of which has Q transmitters and P receivers. While each chip is shown as having multiple transmitters and received, in various embodiments, the chips can include one transmitter and/or one receiver. While each chip in the FMCW radar system 400 is shown as having the same number of transmitters and receivers, in various embodiments, the chips can have different numbers of transmitters and receivers. The chips are indexed by variables m, n∈ 1 . . . N. Hence the FMCW radar system 400 has a total of NPQ channels. Each of the chips has an independent LO. A chip, as used herein, is a collection of channels tied to a specific LO. This is irrespective of whether that single LO domain is actually implemented in hardware by a single chip, multiple chips, or is only a portion of a chip.

In measuring the mutual coupling path lengths for the channels during the offline calibration process, a target can be placed in front of the FMCW radar system 400 at a known range. As will be discussed in greater detail later, the mutual coupling path lengths can then be identified based on the known range of the target and by operating the FMCW radar system 400 to interact with the target at the known range. Alternatively, the mutual coupling path lengths can be identified during the offline calibration process through another applicable technique, such as by injecting a known signal into a receiver or connecting the transmitter and receiver through a delay path of a known length.

In identifying the mutual coupling path lengths in the FMCW radar system 400 a mutual coupling delay matrix $D_c^n$ can be identified for each of the N chips in the FMCW radar system 400. As discussed previously, in any collection of antennas such as the system shown in FIG. 4, there will be mutual coupling between all the antennas. One such mutual coupling path is shown as $d_c^{111}$ in FIG. 4. $d_c^{111}$ is an intra-chip mutual coupling path. An intra-chip mutual coupling path or channel, as used herein, is one that starts and ends on the same chip and is therefore transmitted and received at elements that share the same LO. Inter-chip mutual coupling paths or channels also exist, which are not shown in FIG. 4, and connect antennas across chips. FIG. 4 also shows an inter-chip path to the target and back, denoted by the line segments $d_{T21}$ and $d_{RNP}$. Additionally, FIG. 4 shows an intra-chip path to the target and back denoted by the line segments $d_{T1x}$ and $d_{R1y}$. For clarity purposes in the following discussion, x is used to refer to any of the transmitters on the chip, x∈ 1, 2, . . . , Q and y is used to refer to any of the receivers on the chip, y∈ 1, 2, . . . , P.

In various embodiments, the offline calibration is performed first using the intra-chip channels and then using the inter-chip channels. However, if the chips contain only a single transmit or receive channel, then the intra-chip calibration step is not performed.

In identifying the mutual path lengths in the offline calibration process, the internal delays of the transmit path $\tau_{tx_m}$ and the receive path $\tau_{rx_m}$ of a single chip are identified. In particular, an intra-chip channel is selected and measured during operation of the FMCW radar system 400 with respect to the known target. The measured results for the channel include the return from the target and the mutual coupling signal representing the mutual coupling that exists in the channel.

Figure 5:
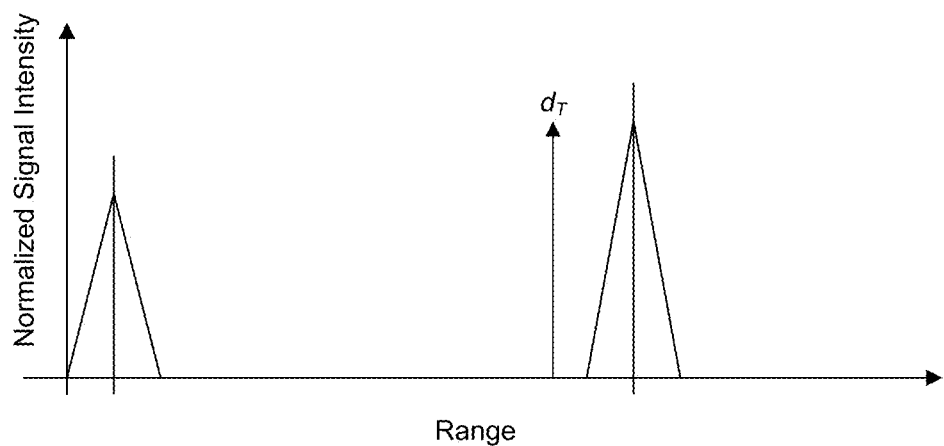
FIG. 5 shows the measurements in an intra-chip channel during an offline calibration, in accordance with some embodiments.

FIG. 5 shows the measurements in an intra-chip channel during an offline calibration, in accordance with some embodiments. In FIG. 5, the horizontal axis is range and the vertical axis is normalized signal intensity. Units of range can imply that pulse compression has taken place, if necessary. For clarity purposes, only the signals that exceed the noise floor are shown in FIG. 5. There is an arrow at position $d_T$ which is the known position of the target in the test range. The actual signal from the target will appear at a different range, $d_T^*$. The error between the actual and the measured range is due to the internal delays of the transmit path and receive paths within the chip, $\tau_{tx_m}$ and $\tau_{rx_m}$. $d_T^*$ can be expressed as shown below in Equation 11.

$$d_T^* = d_T + \Gamma_{T1x} + \Gamma_{R1y} \qquad \text{Equation 11}$$

$$\text{where, } \Gamma_{T1x} = \tau_{tx_k} \cdot c \qquad \text{Equation 12}$$

$$\text{and } \Gamma_{R1y} = \tau_{rx_k} \cdot c \qquad \text{Equation 13}$$

Channel k is defined as the transmission path from the $x^{th}$ transmitter on chip 1 to the $y^{th}$ receiver on chip 1 and c is the speed of light. Since the range to the target is known, the combined delay of both the transmit and receive signal paths can be solved together as show in Equation 14.

$$\Gamma_{T1x} + \Gamma_{R1y} = d_T^* - d_T \qquad \text{Equation 14}$$

This process can be repeated for other intra-chip channels for a given chip to build a matric of internal delay for the chip. Equation 15, shown below illustrates this matrix for chip n.

$$\Gamma_n = \begin{bmatrix} \Gamma_{Tn1} + \Gamma_{Rn1} & \cdots & \Gamma_{TnQ} + \Gamma_{Rn1} \\ \vdots & \ddots & \vdots \\ \Gamma_{Tn1} + \Gamma_{RnP} & \cdots & \Gamma_{TnQ} + \Gamma_{RnP} \end{bmatrix} \qquad \text{Equation 15}$$

In various embodiments, the entire internal delay matrix does not need to be known in performing the offline calibration. For example, on a semiconductor die that is 1 mm², the difference in delay time between any two possible signal paths is very small. Hence and in various embodiments, a subset of the matrix on a level of granularity as small as one element can be used in performing the offline calibration. In various embodiments, multiple measurements can be taken of the same channel and combined in a manner to increase the measurement precision, e.g. by averaging the measurements for a channel. In other embodiments, multiple measurements can be taken of multiple channels and combined in a manner to increase the measurement precision, e.g. by averaging across the channels.

In various embodiments, the internal delay matrix $\Gamma_n$ can be known before the offline calibration is performed, either from simulation, from direct measurement, or from a combination of the two. As follows, these known values can be used for subsequent processing instead of making the previously described channel measurements.

As shown in FIG. 5, the response also includes a second peak $d_{leak}$ that is due to the mutual coupling, e.g. leakage, between the transmitter and receiver forming the intra-chip channel. This leakage is shown below in Equation 16.

$$d_{leak} = \Gamma_{T1x} + \Gamma_{R1y} + d_c^{1x1y} \qquad \text{Equation 16}$$

The apparent range of this peak is the sum of the internal delays $\Gamma_{T1x}$ and $\Gamma_{R1y}$ plus the term $d_c^{1x1y}$. $d_c^{1x1y}$ is the residual delay caused by the mutual coupling path and is therefore the mutual coupling path length. As discussed before, this is not necessarily the geometric path length, but is affected by the antenna spacing, wavelength and other factors. Using the mutual coupling peak and the internal delays found in the internal delay matrix the mutual coupling path length can be identified according to Equation 17.

$$d_c^{1x1y} = d_{leak} - (\Gamma_{T1x} + \Gamma_{R1y}) \qquad \text{Equation 17}$$

This process can be repeated for other intra-chip channels for the chip to build a matrix of mutual coupling path delays for chip n according to Equation 18.

$$D_c^n = \begin{bmatrix} d_c^{m1n1} & \cdots & d_c^{mQn1} \\ \vdots & \ddots & \vdots \\ d_c^{m1nP} & \cdots & d_c^{mQnP} \end{bmatrix} \qquad \text{Equation 18}$$

As before, the transmitters are numbered from 1 to Q and the receivers are numbered from 1 ... P. This procedure can be repeated for all N chips in the circuit to obtain the delay matrix $D_c^n$ for each chip.

Figure 6:
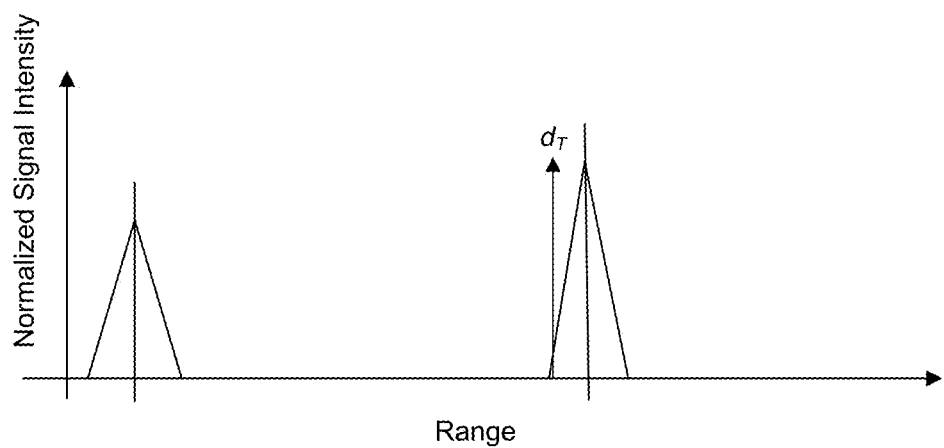
FIG. 6 shows the measurements in an inter-chip channel during an offline calibration, in accordance with some embodiments.

Next in the offline calibration process, the inter-chip channels are measured. Specifically, an inter-chip channel is selected and a measurement is taken. FIG. 6 shows the measurements in an inter-chip channel during an offline calibration, in accordance with some embodiments. In FIG. 6, the horizontal axis is range and the vertical axis is normalized signal intensity. As before, the ground truth target position is $d_T$, but a peak appears for the target at an offset position according to Equation 19.

$$d_T^* = d_T + \Gamma_{Tmax} + \Gamma_{Rny} + \Gamma_{\Delta f} \qquad \text{Equation 19}$$

Because this is a measurement taken between different chips, there is a new delay term $\Gamma_{\Delta f}$ corresponding to the inter-chip delay occurring because of the differences between the different LOs of the chips in phase, start frequency, and/or trigger time. This term can be the same for any two channels between any same pairs of two chips since all channels in a chip share a local oscillator. Further, because of the steady-state assumption described earlier, it can be assumed that the $\Gamma_{\Delta f}$ term remains constant over the calibration interval.

In identifying the mutual coupling path lengths for the inter-chip channels, the $d_T^*$ peak can be used to identify the inter-chip oscillator delay term according to Equation 20.

$$\Gamma_{\Delta f} = d_T^* - d_T - (\Gamma_{Tmx} + \Gamma_{Rny}) \qquad \text{Equation 20}$$

As before, the range of the target, $d_T$, is known since the measurement is being conducted in an offline/test environment. In various embodiments, the chips in the circuit are identical, in which case the internal delay terms $\Gamma_{Tmx}$ and $\Gamma_{Rny}$ may be constant for every chip in the system. If this is true, these values can be found in an internal delay matrix $\Gamma_n$ found earlier during intra-chip calibration. In various embodiments, the internal delays $\Gamma_{Tmx}$ and $\Gamma_{Rny}$ are known from direct measurement or simulation.

Similar to the measurement shown in FIG. 5, the signal in FIG. 5 contains another peak $d_{leak}$ that is due to mutual coupling in the inter-chip channel. This can be represented as shown in Equation 21.

$$d_{leak} = \Gamma_{T1x} + \Gamma_{R1y} + d_c^{mxny} + \Gamma_{\Delta f} \qquad \text{Equation 21}$$

As in the intra-chip case, the goal of inter-chip calibration is to obtain the mutual coupling path delay matrix $D_c^n$ for inter-chip channel paths, as shown in Equation 22.

$$D_c^{mn} = \begin{bmatrix} d_c^{m1n1} & \cdots & d_c^{mQn1} \\ \vdots & \ddots & \vdots \\ d_c^{m1nP} & \cdots & d_c^{mQnP} \end{bmatrix} \qquad \text{Equation 22}$$

As the inter-chip oscillator delay $\Gamma_{\Delta f}$ has been identified, the inter-chip mutual coupling path length represented by the delay $d_c^{mxny}$ for the inter-chip channel can be solved for according to Equation 23.

$$d_c^{mxny} = d_{leak} - (\Gamma_{Tmx} + \Gamma_{Rny}) - \Gamma_{\Delta f} \qquad \text{Equation 23}$$

This process can be repeated for other inter-chip channels in the FMCW radar system 400 to obtain $D_c^{mn}$. As follows, the inter-chip and intra-chip mutual coupling path delays corresponding to the mutual coupling path lengths can be combined to form a full mutual coupling delay matrix according to Equation 24.

$$D_c = \begin{bmatrix} D_c^1 & D_c^{12} & \cdots & D_c^{1N} \\ \vdots & \ddots & & \vdots \\ \vdots & & \ddots & \vdots \\ D_c^{N1} & D_c^{N2} & \cdots & D_c^{1N} \end{bmatrix} \qquad \text{Equation 24}$$

After the offline calibration is performed, a calibration can be performed during operation of the FMCW radar system 400, in what is referred to herein as an online calibration. The online calibration can be performed at a specific time or periodically, e.g. once per calibration window. The purpose of the online calibration is to measure correction factors between each pair of LOs in the circuit.

Online calibration can be performed using the mutual coupling path lengths identified during the offline calibration. Specifically, by using the mutual coupling path lengths measured in the offline calibration process, the local oscillator correction factors, as shown in Equation 6, can be calculated. The online calibration process includes selecting an initial inter-chip channel and identifying LO correction factors for the channel. Specifically, since all intra-chip channels share the same LO, there is no need to iterate over these channels as there are not a plurality of oscillators to synchronize across these channels.

Returning to Equations 4 through 6, to perform local oscillator synchronization, two correction factors can be used. Specifically, a frequency correction $\Delta\omega$ and a phase correction $\Delta\phi$ can be used to synchronize the oscillators. The signal from an oscillator $v_2$ can then be multiplied with a complex exponential to obtain a signal synchronized with an oscillator $v_1$, as represented in Equation 6.

Figure 7:
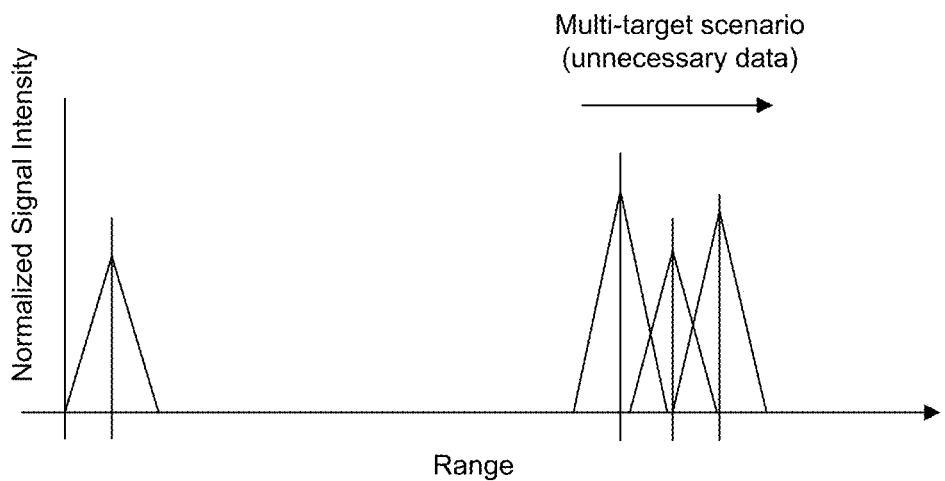
FIG. 7 shows a signal received during normal operation of the FMCW radar system 400, in accordance with some embodiments.

To obtain the frequency correction term, the FMCW radar system 400 can be operated normally. FIG. 7 shows a signal received during normal operation of the FMCW radar system 400, in accordance with some embodiments. As one example, the signal shown in FIG. 7 is the signal that would appear at the receiver of the FMCW radar system 400. Note however that this is only one example application, and this calibration technique is appropriate for applicable electronic systems. In FIG. 7, the horizontal axis is range and the vertical axis is normalized signal intensity. The peaks to the right are returns from targets located down range. The peak to the left is the signal due to mutual coupling/leakage between antennas. In various embodiments the leakage signal will be obvious because it will be the only signal occurring below the minimum range of the unit. In various embodiments, the mutual coupling delay matrix $D_c$ can be used to identify an initial estimate of the position of the peak corresponding to mutual coupling between antennas. In various embodiment, the initial estimate of the mutual coupling peak position can then be refined with a numerical optimization algorithm, peak finding routine, maximum likelihood estimate, or the like.

Once the location of the mutual coupling peak is found, the inter-chip oscillator delay term $\Gamma_{\Delta f}$ can be identified according to Equation 25.

$$\Gamma_{\Delta f} = d_{leak} - \Gamma_{Tmx} - \Gamma_{Rny} - d_c^{mxny} \qquad \text{Equation 25}$$

$d_{leak}$ is the range at which the mutual coupling peak is found. The internal delays $\Gamma_{Tmx}$ and $F_{Rny}$ are known from the internal delay matrix $\Gamma_n$ that was identified previously in the offline calibration. Additionally, the mutual coupling delay $d_c^{mxny}$ is known from the mutual coupling delay matrix $D_c$ measured in the offline calibration step. Note that since the horizontal axis above has units of distance, all quantities summing to produce $d_{leak}$ can have units of distance. The frequency offset $\Delta\omega$ between the oscillators in the channel, corresponding to the frequency correction, can be calculated based on the inter-chip oscillator delay term $\Gamma_{\Delta f}$ according to Equation 26.

$$\Delta\omega = 2\pi \frac{\Gamma_{\Delta f}}{c} \alpha \qquad \text{Equation 26}$$

In Equation 26, c is the speed of light in meters per second and $\alpha$ is the FMCW modulation slew rate in Hz per second.

The phase correction $\Delta\phi$ can be obtained by measuring the phase of the leakage peak and performing a phase correction based on the leakage path length obtained during the offline calibration and stored in $D_c$. The received signal can be demodulated using a quadrature demodulator. This demodulation measures the phase of the values in the measurement shown in FIG. 7. The phase of the peak that exists at $d_{leak}$ is denoted as $\phi_{leak}$, in radians. The phase correction $\Delta\phi$ can be found According to Equation 27.

$$\Delta\phi = \phi_{leak} - 2\pi \frac{d_c^{mxny}}{\lambda} \qquad \text{Equation 27}$$

$d_c^{mxny}$ is the leakage path length corresponding to the current channel, from chip m to chip n and from transmitter x to receiver y. The wavelength of the carrier frequency is $\lambda$ in meters. As follows, the phase correction and the frequency correction can be applied by an oscillator synchronizer, e.g. the oscillator synchronizer 306, to synchronize oscillators, e.g. the first oscillator 304-1 and the second oscillator 304-2.

The disclosure now turns to a discussion of identifying a transmit path delay for a chip. Specifically, calculating the values of $\Gamma_{T1x}$ and $\Gamma_{R1y}$ may be necessary in applications where the assumption of constant internal delay time across chips may not be valid. This could be because there is too much variation in semiconductor processes, because the required tolerances are too tight, because not all circuit elements used to implement the array are identical, to account for temperature differences, or for some other reason. Therefore, in some embodiments it may be desirable to measure the internal delay matrix $\Gamma_n$ directly. The internal delay matrix is shown below in Equation 28.

$$\Gamma_n = \begin{bmatrix} \Gamma_{Tn1} + \Gamma_{Rn1} & \cdots & \Gamma_{TnQ} + \Gamma_{Rn1} \\ \vdots & \ddots & \vdots \\ \Gamma_{Tn1} + \Gamma_{RnP} & \cdots & \Gamma_{TnQ} + \Gamma_{RnP} \end{bmatrix} \qquad \text{Equation 28}$$

Each term in the matrix is a sum of two separate delays, one on the transmit side and one on the receive side. If all internal delays are not assumed to be equal, then the individual transmit values $\Gamma_{Tnq}$ and $\Gamma_{Tnp}$ should be solved directly. This is a system of PQ equations and P+Q unknowns. However, if there is just one measurement of a transmit or receive delay, the delays for the entire system can be solved due to the fact that each unique delay appears in either P or Q equations.

Figure 8:
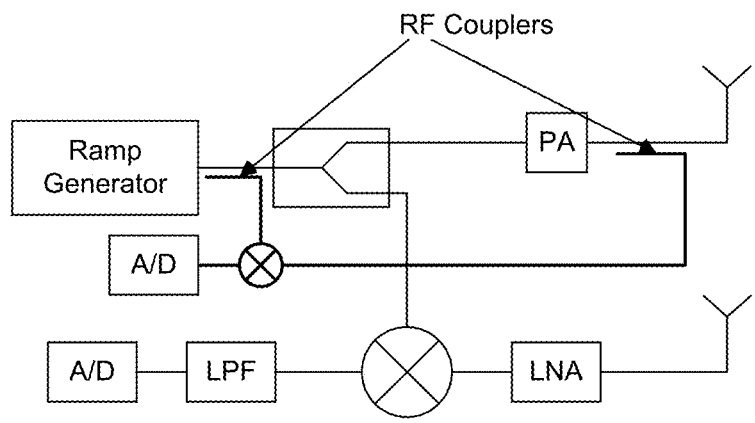
FIG. 8 is an example electronic system 800 for measuring an internal delay in an electronic system, in accordance with some embodiments.

FIG. 8 is an example electronic system 800 for measuring an internal delay in an electronic system, in accordance with some embodiments. In various embodiments, the internal delay can be identified by down-converting the frequency at the beginning of the RF channel and mixing it with the signal from the end of the channel. That delay causes a beat frequency which can be measured easily.

In the example electronic system 800 shown in FIG. 8, an RF coupler samples the local oscillator when the signal leaves the frequency synthesizer. In the electronic system 800, the frequency synthesizer is represented as a ramp generator, however the frequency synthesizer can be an applicable type of frequency synthesizer such as a phase-locked loop (PLL), voltage-controlled oscillator (VCO), frequency multiplier, and a direct digital synthesis (DDS) unit. The coupler is shown as a directional coupler, but this is also an example, and an applicable type of signal dividing element can be used, such as a non-directional coupler, power divider, or another antenna. A second RF coupler then measures the same signal after it has propagated through the transmit chain, including the power amplifier. The RF coupler can be placed in the chip or placed external to the chip, and located, for example, at the input terminal to an antenna in order to capture all delays in the transmit chain from oscillator to antenna.

The signals from both couplers can be mixed, resulting in a beat frequency that is both proportional to the delay in the RF transmit path and is a function of the used signal modulation technique. In various embodiments, the device being measured is the transmit chain of an FMCW radar system, such as the FMCW radar system 400. Accordingly, the output frequency of the delay measurement mixer after filtering the sum frequency can be expressed as shown in Equation 29.

$$f_{delay} = \alpha \tau_{tx} \qquad \text{Equation 29}$$

$\alpha$ is the modulation slew rate in Hz/second, and $\tau_{tx}$ is the transmit path propagation delay between the points being sampled with the RF couplers. Equation 29 can be solved to find the transmit path delay, and other delays in the system can be identified based on the transmit path delay by solving the equations in $\Gamma_n$.

Figure 9:
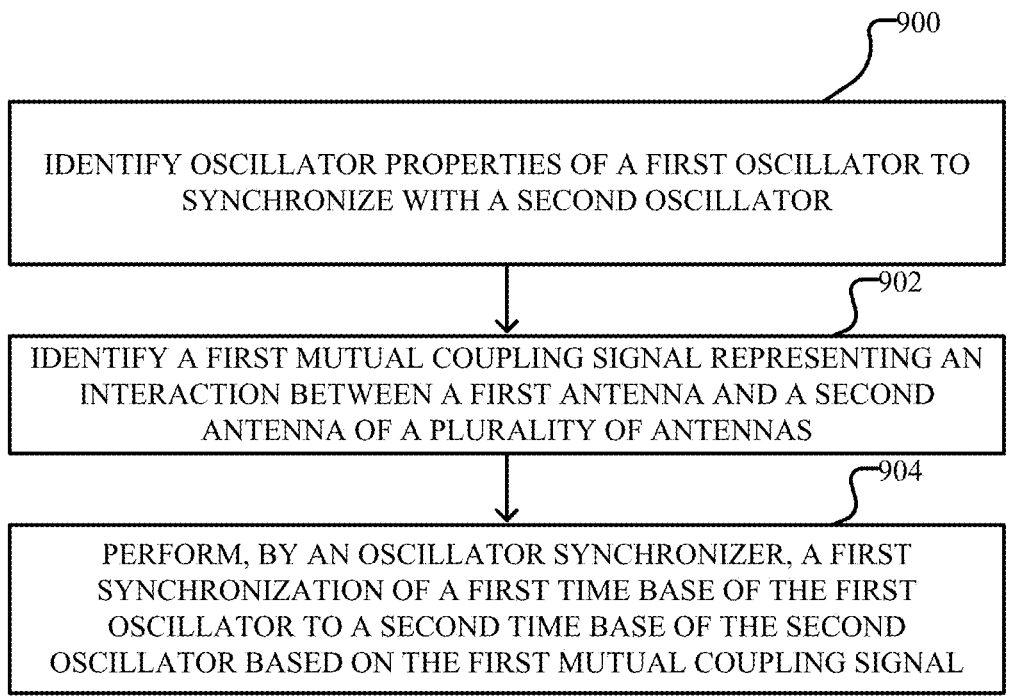
FIG. 9 illustrates a flowchart of an example method of synchronizing oscillators based on mutual coupling between elements, in accordance with some embodiments.

FIG. 9 illustrates a flowchart of an example method of synchronizing oscillators based on mutual coupling between elements, in accordance with some embodiments. The method shown in FIG. 9 is provided by way of example, as there are a variety of ways to carry out the method. Additionally, while the example method is illustrated with a particular order of steps, those of ordinary skill in the art will appreciate that FIG. 9 and the modules shown therein can be executed in any order and can include fewer or more modules than illustrated.

At step 900, oscillator properties of a first oscillator to synchronize with a second oscillator are identified. The oscillator properties can include a frequency of oscillation of the first oscillator, a waveform phase of the first oscillator, and/or other applicable parameters defining operation of the first oscillator. The oscillator properties of the first oscillator can be identified based on a mutual coupling between elements in an electronic system including the first oscillator and the second oscillator. More specifically, the oscillator properties can be identified based on a mutual coupling between a first element affected by the first oscillator and a second element affected by the second oscillator.

At step 902, a first mutual coupling signal representing an interaction between a first antenna and a second antenna of a plurality of antennas is identified. The first antenna can be coupled to the first oscillator and ultimately affected by the output of the first oscillator. The second antenna can be coupled to the second oscillator and ultimately affected by the output of the second oscillator. The mutual coupling signal can represent one or more of an electromagnetic propagation delay due to the interaction, a phase shift introduced by the interaction, an internal delay due to a transmit signal path, an internal delay due to a receive signal path, a difference in trigger times between the first oscillator and the second oscillator, a difference in start frequencies between the first oscillator and the second oscillator, and a difference in initial phases between the first oscillator and the second oscillator.

At step 904, the first oscillator is synchronized with the second oscillator by an oscillator synchronizer based on the first mutual coupling signal. Specifically, the oscillator synchronizer can synchronize a time base of the first oscillator with a time base of the second oscillator based on the first mutual coupling signal. Additionally, the oscillator synchronizer can synchronize the first and second oscillators based on both the first mutual coupling signal and the oscillator properties of the first oscillator.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Methods according to the above-described examples can be implemented using computer-executable instructions that are stored or otherwise available from computer readable media, e.g. a non-transitory computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A system comprising:
a plurality of oscillators comprising at least a first oscillator and a second oscillator;
a plurality of antennas comprising at least a first antenna and a second antenna;
a first oscillator synchronizer coupling the first oscillator to the first antenna, wherein the first oscillator synchronizer is operative to perform a first synchronization of a first time base of the first oscillator to a second time base of the second oscillator based on a first mutual coupling signal, wherein the first mutual coupling signal represents a first interaction between the first antenna and the second antenna.

2. The system of claim 1, wherein:
the plurality of oscillators comprises a third oscillator;
the plurality of antennas comprises a third antenna;
the system comprises a second oscillator synchronizer coupling the third oscillator to the third antenna, wherein the third oscillator synchronizer is operative to perform a second synchronization of a third time base of the third oscillator to the first time base of the first oscillator based on a second mutual coupling signal, wherein the second mutual coupling signal represents a second interaction between the first antenna and the third antenna.

3. The system of claim 1, wherein the oscillator synchronizer is operative to measure the first mutual coupling signal.

4. The system of claim 1, wherein the oscillator synchronizer is operative to:
identify first oscillator properties of the first oscillator to synchronize with the second oscillator;
measure the first mutual coupling signal;
identify first modifications to the first oscillator properties of the first oscillator based on the first mutual coupling signal; and
provide instructions to synchronize the first time base to the second time base using the first modifications to the first oscillator properties.

5. The system of claim 1, wherein the oscillator synchronizer is operative to:
identify first oscillator properties of the first oscillator to synchronize with the second oscillator;
gather from a mutual coupling delay database delay values estimating one or more known delays due to the interaction between the first antenna and the second antenna;
generate a mutual delay signal based on the delay values.

6. The system of claim 1, wherein the first oscillator synchronizer is operative to perform the first synchronization during manufacture of the system.

7. The system of claim 1, wherein the first oscillator synchronizer is operative to perform the first synchronization in an anechoic chamber.

8. The system of claim 1, wherein the first mutual coupling signal is based on a response responding from a transmission signal from the first antenna and the second antenna directed toward a known target at a known range.

9. The system of claim 1, wherein the first oscillator synchronizer is operative to:
receive a power-state signal representing a power state of the system;
perform the first synchronization in response to the power-state signal.

10. The system of claim 1, wherein the first oscillator synchronizer is operative to:
receive an event signal representing an event related to the system;
perform the first synchronization in response to the event signal.

11. The system of claim 1, wherein the first oscillator synchronizer is operative to:
receive a timer signal representing a calibration interval;
perform the first synchronization in response to the timer signal.

12. The system of claim 1, wherein the first oscillator synchronizer is operative to:
identify a first calibration window for synchronizing the first time base; and
perform the first synchronization within the first calibration window.

13. The system of claim 1, wherein the first oscillator and the second oscillator reside on a single chip.

14. The system of claim 1, wherein the first oscillator resides on a first chip and the second oscillator resides on a second chip.

15. The system of claim 1, wherein the first mutual coupling signal represents an intra-chip delay due to the interaction between the first antenna and the second antenna.

16. The system of claim 1, wherein the mutual coupling signal represents a parasitic effect due to locations of the first antenna and the second antenna relative to each other.

17. The system of claim 1, wherein the mutual signal represents an energy from one of the first antenna and the second antenna being absorbed by the other of the first antenna and the second antenna.

18. The system of claim 1, wherein the mutual coupling signal includes information about oscillator properties of the second oscillator.

19. The system of claim 1, wherein:
the first mutual coupling signal includes information about oscillator properties of the second oscillator;
the oscillator properties define a frequency of oscillation, a waveform phase, or some combination thereof.

20. The system of claim 1, wherein the mutual coupling signal represents an antenna signal path delay of a chip comprising the first oscillator synchronizer.

21. The system of claim 1, wherein the mutual coupling signal represents an antenna transmission line delay associated with a first transmission line coupled to either the first oscillator or the second oscillator.

22. The system of claim 1, wherein the mutual coupling signal represents a delay associated with the first antenna.

23. The system of claim 1, wherein the first mutual coupling signal represents one or more of:
an electromagnetic propagation delay due to the first interaction;
a phase shift introduced by the first interaction;
an internal delay due to a transmit signal path;
an internal delay due to a receive signal path;
a difference in trigger times between the first oscillator and the second oscillator;
a difference in start frequencies between the first oscillator and the second oscillator;
a difference in initial phases between the first oscillator and the second oscillator.

24. The system of claim 1, further comprising a first transmission line coupling the first oscillator to the first antenna, wherein the first transmission line comprises a microstrip, a co-planar waveguide, a circuit element that transfers energy between the first antenna and the first oscillator, or some combination thereof.

25. The system of claim 1, wherein the system comprises a Frequency-Modulated Continuous-Wave (FMCW) Radar system.

26. The system of claim 1, wherein the system comprises a Radio Frequency system using a shared time base between the first oscillator and the second oscillator.

27. The system of claim 1, wherein the plurality of antennas comprise Multiple-input multiple-output (MIMO) radar antennas.

28. The system of claim 1, wherein the system is incorporated into one or more of: a vehicle, an automobile, a unmanned aerial vehicle (UAV), a search system, a military radar system, a radio transceiver, and a radio telescope.

29. The system of claim 1, wherein the system is incorporated into one or more of: a video encoding processor, a machine learning accelerator, and a software defined radio.

* * * * *